(12) United States Patent
Yokoyama

(10) Patent No.: US 10,645,243 B2
(45) Date of Patent: May 5, 2020

(54) ELECTRONIC APPARATUS, PRINTING APPARATUS, AND COMMUNICATION SYSTEM

(71) Applicant: SEIKO EPSON CORPORATION, Tokyo (JP)

(72) Inventor: Daiki Yokoyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/120,871

(22) Filed: Sep. 4, 2018

(65) Prior Publication Data

US 2019/0075212 A1 Mar. 7, 2019

(30) Foreign Application Priority Data

Sep. 6, 2017 (JP) ................. 2017-171098

(51) Int. Cl.
*H04N 1/00* (2006.01)
*H04W 4/02* (2018.01)

(52) U.S. Cl.
CPC ..... *H04N 1/00506* (2013.01); *H04N 1/00307* (2013.01); *H04N 1/00891* (2013.01); *H04W 4/023* (2013.01); *H04N 2201/0094* (2013.01)

(58) Field of Classification Search
CPC .................................. H04N 1/00506
USPC ........................................ 358/1.15
See application file for complete search history.

(56) References Cited

U.S. PATENT DOCUMENTS

| | | | |
|---|---|---|---|
| 2014/0355020 A1* | 12/2014 | Shiraishi ............ | H04N 1/00896 358/1.13 |
| 2016/0212283 A1 | 7/2016 | Sato | |
| 2016/0360049 A1* | 12/2016 | Funakawa .......... | H04N 1/00307 |
| 2017/0208427 A1* | 7/2017 | Goto .................. | H04B 17/27 |
| 2017/0276776 A1* | 9/2017 | Ito ..................... | G01S 11/06 |
| 2017/0353909 A1* | 12/2017 | Kawanishi ............ | H04W 4/021 |
| 2018/0349067 A1* | 12/2018 | Kanamaru .......... | H04N 1/00413 |

FOREIGN PATENT DOCUMENTS

JP 2016-123038 A 7/2016

* cited by examiner

*Primary Examiner* — Jacky X Zheng
(74) *Attorney, Agent, or Firm* — Workman Nydegger

(57) ABSTRACT

An electronic apparatus includes: a communication unit that receives a beacon signal from a terminal apparatus; a display unit; and a processing unit that performs display processing of the display unit. The processing unit performs processing of displaying a screen to be displayed to a user of the terminal apparatus from which the beacon signal is transmitted, on the display unit, in a first display mode, in a case where it is determined that a distance between the terminal apparatus and the electronic apparatus is equal to or shorter than a first reference distance based on a reception radio wave intensity of the beacon signal.

10 Claims, 11 Drawing Sheets

FIG. 4
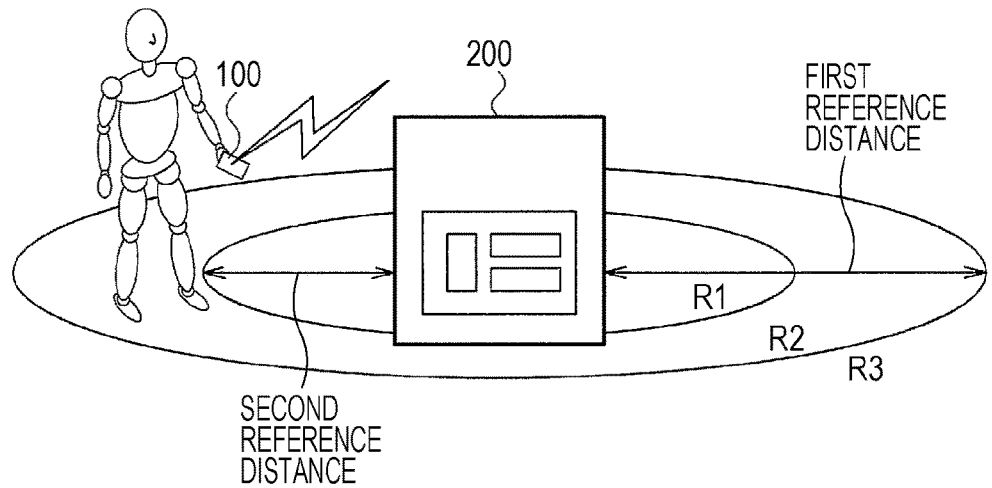
FIG. 5
| TRANSMISSION SOURCE ADDRESS | IDENTIFICATION INFORMATION OF TERMINAL APPARATUS | RADIO WAVE INTENSITY AS REFERENCE OF DISTANCE | USE HISTORY INFORMATION |
|---|---|---|---|
FIG. 6
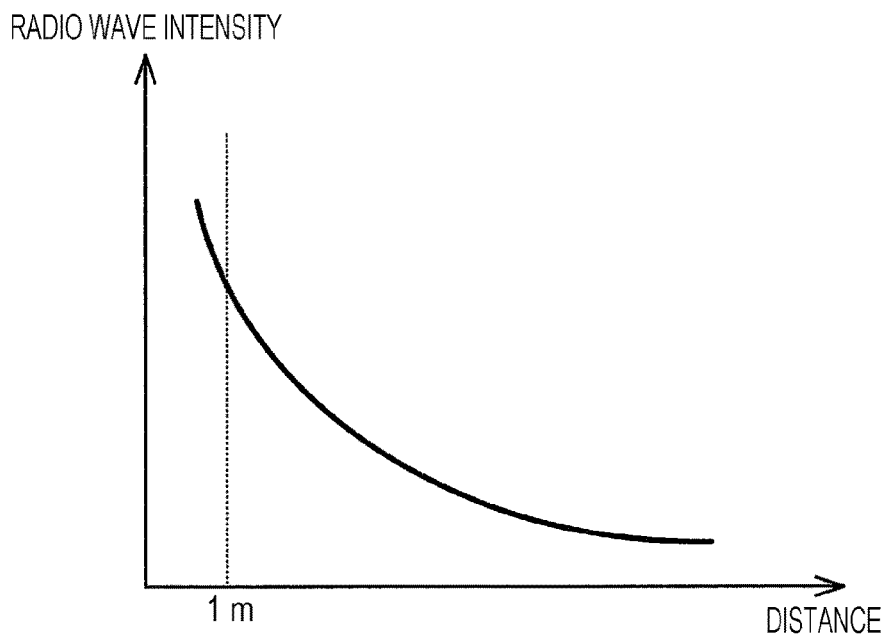

ELECTRONIC APPARATUS, PRINTING APPARATUS, AND COMMUNICATION SYSTEM

BACKGROUND

1. Technical Field

The present invention relates to an electronic apparatus, a printing apparatus, and a communication system.

2. Related Art

In related art, an electronic apparatus having various functions is known. Here, the electronic apparatus is, for example, a printer (multifunction peripheral) having a scan function, a facsimile function, a copy function, and the like in addition to a print function. In such an electronic apparatus, a user is required to select which function to use. For this reason, icons for each function are disposed on a home screen side by side. As a result, there is a problem that the user has a trouble for searching and selecting a function that the user wants to use from the home screen.

JP-A-2016-123038 discloses a method in which a multifunction peripheral receives a beacon signal from a terminal apparatus, specifies a terminal apparatus from which a beacon signal with the strongest reception radio wave intensity is transmitted, and displays a unique screen (an individual standby screen) for the specified terminal apparatus on a display unit of the multifunction peripheral.

The multifunction peripheral disclosed in JP-A-2016-123038 performs a simple state control (display control) of displaying a unique screen for a terminal apparatus with the strongest reception radio wave intensity. As a result, in the method disclosed in JP-A-2016-123038, it is difficult to realize a flexible state control (state control predicted to be desired by a user) according to a situation of a user.

SUMMARY

An advantage of some aspects of the invention is to provide an electronic apparatus, a printing apparatus, and a communication system capable of performing a flexible state control according to a situation of a user.

According to an aspect of the invention, there is provided an electronic apparatus including: a communication unit that receives a beacon signal from a terminal apparatus; a display unit; and a processing unit that performs display processing of the display unit, in which the processing unit performs processing of displaying a screen to be displayed to a user of the terminal apparatus from which the beacon signal is transmitted, on the display unit, in a first display mode, in a case where it is determined that a distance between the terminal apparatus and the electronic apparatus is equal to or shorter than a first reference distance based on a reception radio wave intensity of the beacon signal, and in which the processing unit performs processing of displaying a screen to be displayed to the user of the terminal apparatus from which the beacon signal is transmitted, on the display unit, in a second display mode different from the first display mode, in a case where it is determined that the distance is equal to or shorter than a second reference distance which is shorter than the first reference distance.

In the electronic apparatus, the processing unit changes the display mode of the display unit based on a determination result of a relationship between the distance between the terminal apparatus and the electronic apparatus and the first reference distance, and a determination result of a relationship between the distance between the terminal apparatus and the electronic apparatus and the second reference distance. In this configuration, by setting a plurality of reference distances, it is possible to perform a flexible display control according to the distance between the terminal apparatus and the electronic apparatus, and thus an appropriate control according to a situation of the user can be realized.

In the electronic apparatus, the processing unit may perform processing of generating the screen and processing of turning-off a light source of the display unit in a case where it is determined that the distance is equal to or shorter than the first reference distance and longer than the second reference distance, and the processing unit may perform processing of turning-on the light source in a case where it is determined that the distance is equal to or shorter than the second reference distance.

In this configuration, it is possible to perform a display control considering a balance between power consumption and convenience of a user.

In the electronic apparatus, the processing unit may perform processing of causing the display unit to transition to a non-display state in a case where it is determined that the distance is longer than the first reference distance or in a case where the beacon signal is not received.

In this configuration, it is possible to reduce power consumption of the electronic apparatus in a case where approach of the terminal apparatus is not detected.

In the electronic apparatus, in a power saving state, in a case where it is determined that the distance is equal to or shorter than the first reference distance, the processing unit may perform return processing from the power saving state. In a state returned from the power saving state, in a case where it is determined that the distance exceeds a third reference distance which is equal to or longer than the first reference distance, the processing unit may performs transition processing to the power saving state.

In this configuration, it is possible to realize returning from the power saving state and transition to the power saving state based on the distance between the terminal apparatus and the electronic apparatus. Further, the plurality of reference distances can be set, and thus a flexible state transition can be realized.

According to another aspect of the invention, there is provided an electronic apparatus including: a communication unit that receives a beacon signal from a terminal apparatus; a display unit; and a processing unit that performs display processing of the display unit, in which, in a case where it is determined that a distance between the terminal apparatus and the electronic apparatus is equal to or shorter than a first reference distance based on a reception radio wave intensity of the beacon signal, the processing unit performs processing of determining a screen to be displayed to a user of the terminal apparatus from which the beacon signal is transmitted based on at least one of authentication job information of the user of the terminal apparatus from which the beacon signal is transmitted, use history information of the user, and user type information, and displaying the determined screen on the display unit.

In the electronic apparatus, the processing unit determines a screen to be displayed to the user based on the authentication job information, the use history information, and the user type information in addition to the determination result of the relationship between the distance between the terminal apparatus and the electronic apparatus and the first reference distance. In this configuration, it is possible to display an appropriate screen according to the terminal apparatus and dynamically change the screen according to a status of the terminal apparatus (the user who uses the terminal apparatus).

In the electronic apparatus, in a case where it is determined that setting for performing authentication processing is enabled in an execution of a job and it is determined that there is a job corresponding to the user of the terminal apparatus at the distance equal to or shorter than the first reference distance based on the authentication job information, the processing unit may perform processing of displaying a job selection screen on the display unit.

In this configuration, by using the authentication job information, it is possible to determine the presence or absence of a user with a high probability of using the electronic apparatus, and to display a screen with high convenience in a case where the user exists.

In the electronic apparatus, the processing unit may acquire the use history information of the user of the terminal apparatus from which the beacon signal is transmitted based on the beacon signal, and the processing unit may perform processing of selecting one function among a plurality of functions of the electronic apparatus based on the use history information and displaying the screen corresponding to the selected function on the display unit.

In this configuration, by using the use history information, it is possible to display a screen related to a function with a high probability of being used by a target user, as a display target, and thus it is possible to improve convenience of the user.

In the electronic apparatus, the processing unit may acquire, as the user type information, information indicating whether or not the user of the terminal apparatus from which the beacon signal is transmitted is a user who performs maintenance, based on the beacon signal, and the processing unit may perform processing of displaying a maintenance screen on the display unit in a case where the user is a user who performs maintenance.

In this configuration, by using the user type information, it is possible to display an appropriate screen for a specific type user.

In the electronic apparatus, in a case where it is determined that setting for performing authentication processing is enabled in an execution of a job and it is determined that there are a plurality of terminal apparatuses at the distance equal to or shorter than the first reference distance, the processing unit may perform processing of specifying any one of the terminal apparatuses based on authentication job information, and displaying the screen corresponding to the specified terminal apparatus on the display unit.

In this configuration, in a case where there are a plurality of terminal apparatuses within a range equal to or shorter than the first reference distance, it is possible to perform display for a user with a high probability of using the electronic apparatus.

In the electronic apparatus, the processing unit may determine the number of authentication job corresponding terminal apparatuses, each of which is the terminal apparatus as being determined that the distance is equal to or shorter than the first reference distance and determined that the job corresponding to the user of the terminal apparatus is present based on the authentication job information. In a case where there is only one authentication job corresponding terminal apparatus, the processing unit may perform processing of displaying the screen corresponding to the authentication job corresponding terminal apparatus on the display unit. In a case where there are a plurality of authentication job corresponding terminal apparatuses, the processing unit may perform processing of displaying the screen corresponding to the terminal apparatus with the strongest radio wave intensity of the beacon signal among the plurality of authentication job corresponding terminal apparatuses, on the display unit.

In this configuration, it is possible to appropriately execute processing of specifying a user (terminal apparatus) using the authentication job information.

According to still another aspect of the invention, there is provided a printing apparatus including: a communication unit that receives a beacon signal based on a Bluetooth communication standard from a terminal apparatus; and a processing unit, in which, in a power saving state, in a case where it is determined that a distance between the terminal apparatus and the printing apparatus is equal to or shorter than a first reference distance based on a reception radio wave intensity of the beacon signal, the processing unit performs return processing from the power saving state, and in which, in a state returned from the power saving state, in a case where it is determined that the distance exceeds a predetermined reference distance which is equal to or longer than the first reference distance, the processing unit performs transition processing to the power saving state.

In the printing apparatus, the processing unit performs a control related to the power saving state based on a relationship between a distance between the terminal apparatus and the printing apparatus and the first reference distance and a relationship between the distance and a predetermined reference distance equal to or longer than the first reference distance. In this configuration, it is possible to realize returning from the power saving state and transition to the power saving state based on the distance between the terminal apparatus and the printing apparatus. Further, by setting a plurality of reference distances, it is possible to realize a flexible state transition.

According to still another aspect of the invention, there is provided a communication system including: the electronic apparatus; and a terminal apparatus.

BRIEF DESCRIPTION OF THE DRAWINGS

The invention will be described with reference to the accompanying drawings, wherein like numbers reference like elements.

FIG. 4 is a schematic diagram for explaining a reference distance according to a first embodiment.

FIG. 5 is an example of a data structure of a beacon signal (advertisement packet).

FIG. 6 is an example of a relationship between a distance and a reception radio wave intensity.

DESCRIPTION OF EXEMPLARY EMBODIMENTS

Hereinafter, the present embodiment will be described. The present embodiment to be described below is not intended to limit contents of the invention described in the claims. In addition, all of configurations to be described in the present embodiment are not necessarily required in the invention.

1. Communication System

Figure 1:
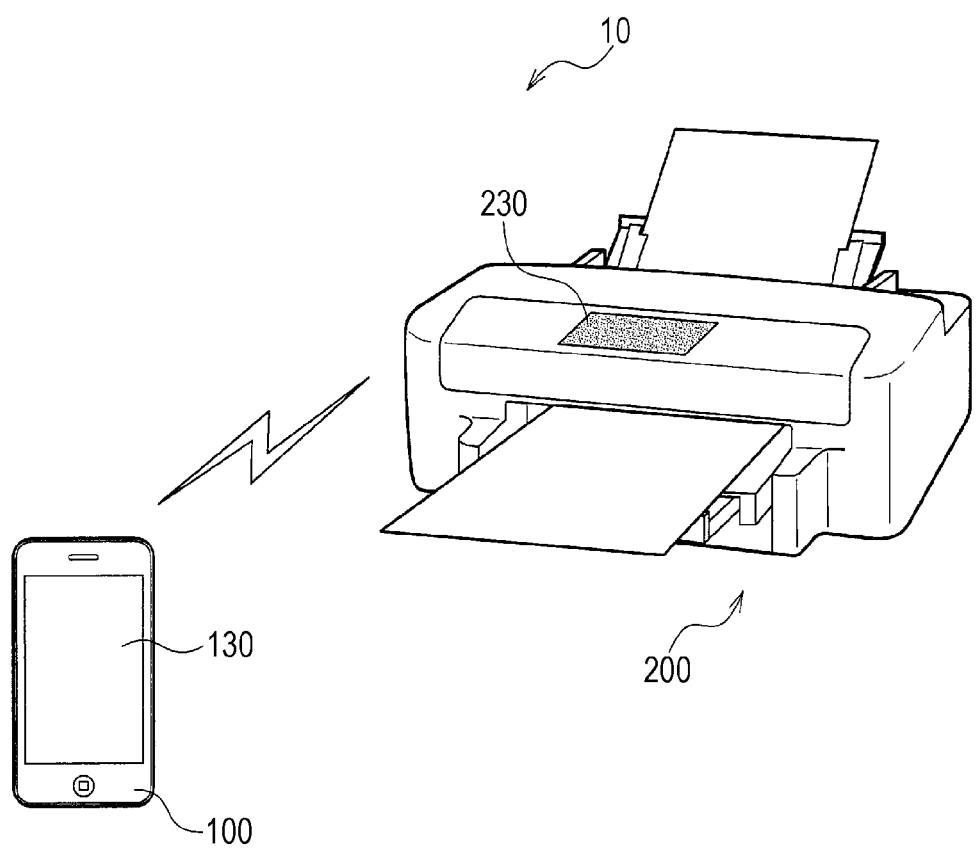
FIG. 1 is a configuration example of a communication system including a terminal apparatus and an electronic apparatus.

FIG. 1 is a diagram schematically illustrating an example of a communication system 10 according to the invention. The communication system 10 includes a terminal apparatus 100 and an electronic apparatus 200. The terminal apparatus 100 is, for example, a portable terminal apparatus such as a smartphone. The electronic apparatus 200 is, for example, a printer (printing apparatus). Here, the electronic apparatus 200 according to the present embodiment may be any one of a scanner, a facsimile apparatus, and a copier. Alternatively, the electronic apparatus 200 may be a multifunction peripheral (MFP) having a plurality of functions. The communication system 10 is not limited to the configuration of FIG. 1, and various modifications such as addition of other components may be made. For example, although one terminal apparatus 100 is illustrated in FIG. 1, a plurality of terminal apparatuses 100 may be connected to one electronic apparatus 200. In addition, even in FIGS. 2 and 3 to be described later, modifications such as omission or addition of components may be similarly made.

The terminal apparatus 100 and the electronic apparatus 200 can perform wireless communication. Here, the wireless communication is communication based on a Bluetooth (registered trademark) standard, and in a narrow sense, is communication based on a Bluetooth Low Energy (BLE) standard. The terminal apparatus 100 and the electronic apparatus 200 can also perform wireless communication based on a standard different from BLE, for example, communication based on a Wi-Fi (registered trademark) standard.

Figure 2:
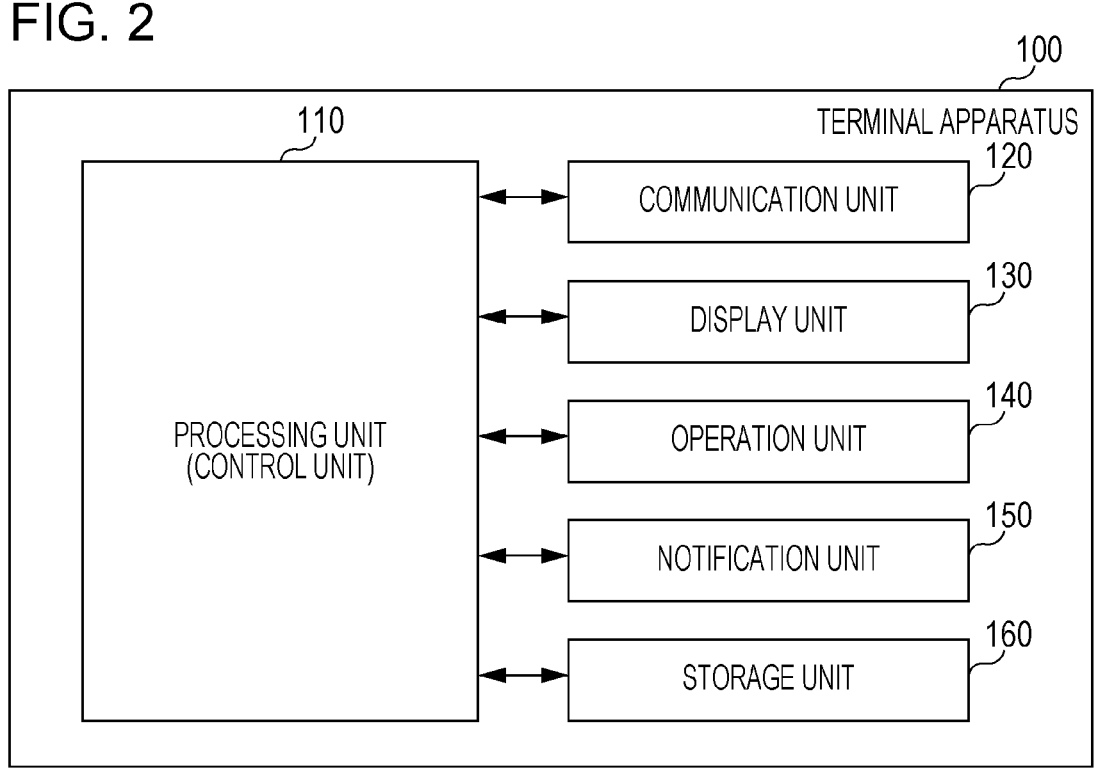
FIG. 2 is a configuration example of the terminal apparatus.

FIG. 2 is a block diagram illustrating an example of a configuration of the terminal apparatus 100. The terminal apparatus 100 includes a processing unit 110 (processor), a communication unit 120 (communication interface), a display unit 130 (display), an operation unit 140 (operation buttons or the like), a notification unit 150 (notification interface), and a storage unit 160 (memory).

The processing unit 110 (processor, controller) controls each unit of the communication unit 120, the display unit 130, the operation unit 140, the notification unit 150, and the storage unit 160.

In the present embodiment, each processing (each function) to be performed by each unit of the processing unit 110 may be realized by a processor (processor including hardware). For example, in the present embodiment, each processing may be realized by a processor that operates based on information such as a program and a storage device (memory) that stores information such as a program. Here, in the processor, for example, a function of each unit may be realized by individual hardware, or a function of each unit may be realized by integrated hardware. For example, the processor may include hardware, and the hardware may include at least one of a circuit for processing a digital signal and a circuit for processing an analog signal. For example, the processor may be configured with one or a plurality of circuit devices (for example, ICs or the like) mounted on a circuit board, or one or a plurality of circuit elements (for example, resistors, capacitors, or the like). The processor may be, for example, a CPU. Here, the processor is not limited to a CPU, and various processors such as a graphics processing unit (GPU) or a digital signal processor (DSP) may be used. In addition, the processor may be configured with a hardware circuit using an ASIC. In addition, the processor may be configured with a plurality of CPUs, or may be configured with hardware circuits using a plurality of ASICs. In addition, the processor may be configured by a combination of a plurality of CPUs and hardware circuits using a plurality of ASICs. In addition, the processor may include an amplifier circuit, a filter circuit, or the like for processing an analog signal. The memory may be a semiconductor memory such as an SRAM or a DRAM, may be a register, may be a magnetic storage device such as a hard disk device, or may be an optical storage device such as an optical disk device. For example, the memory stores a computer-readable instruction. The instruction is executed by the processor, and thus a function of each unit (the communication unit, the processing unit, and the like) of the terminal apparatus 100 is realized. Here, the instruction may be an instruction of an instruction set of a program, or an instruction for instructing a hardware circuit of a processor to perform an operation. For example, the storage unit 160 stores an operating system (OS) and application software, and the processing unit 110 controls each unit by an operation based on the OS or the like.

The communication unit 120 (wireless communication unit) is realized by at least one communication device (wireless communication device). The communication unit 120 includes a wireless communication device (wireless communication chip) that executes wireless communication based on a BLE standard. Here, the communication unit 120 may include a wireless communication device that executes wireless communication based on a standard other than the BLE standard.

The display unit 130 is configured with a display or the like that displays various kinds of information to a user, and the operation unit 140 is configured with a button or the like that receives an input operation from a user. The display unit 130 and the operation unit 140 may be integrally configured with, for example, a touch panel. The notification unit 150 performs notification to the user. The notification unit 150 may be configured with, for example, a speaker for notification using a sound, a vibration unit (vibration motor) for notification using a vibration, or a combination of a speaker and a vibration unit.

The storage unit 160 (storage device) is configured with a storage medium such as a hard disk drive (HDD), a read only memory (ROM), or a random access memory (RAM). For example, the terminal apparatus 100 includes an imaging unit (camera) (not illustrated), and the storage unit 160 stores image data (including a still image and a moving image) captured by the imaging unit.

Figure 3:
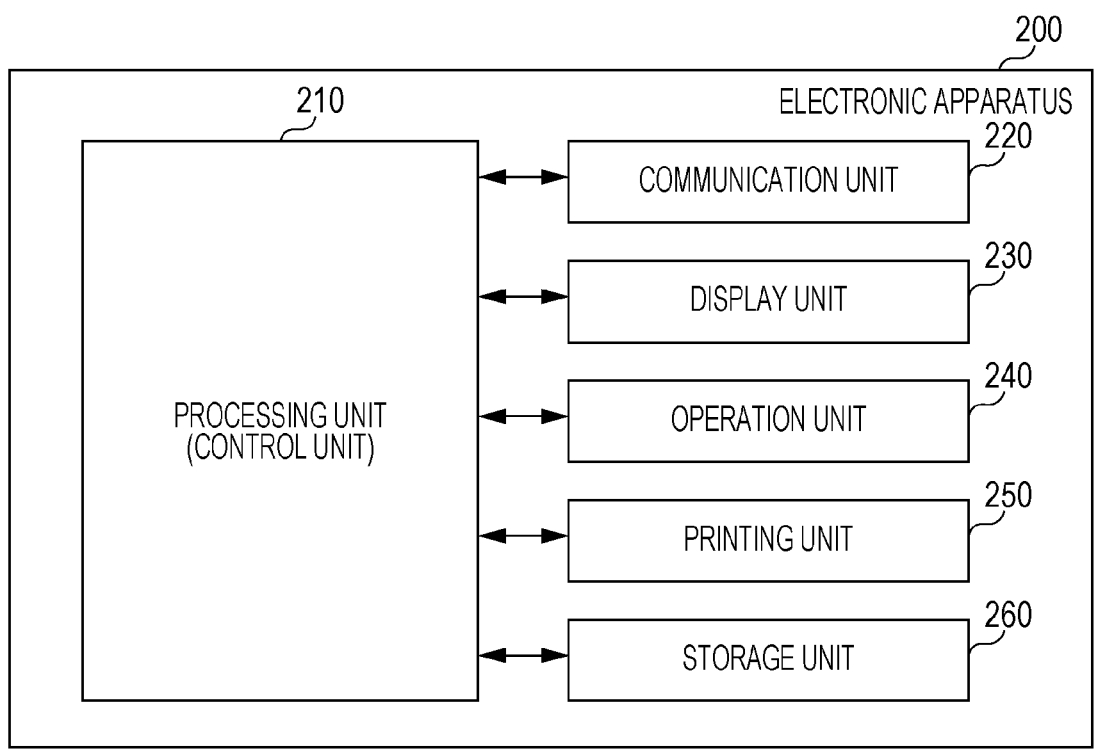
FIG. 3 is a configuration example of the electronic apparatus.

FIG. 3 is a block diagram illustrating an example of a configuration of the electronic apparatus 200. FIG. 3 illustrates an electronic apparatus 200 (printer) having a printing function. In the following description, an example in which the electronic apparatus 200 is a printer will be described. Here, as described above, the electronic apparatus 200 may be extended to an apparatus other than a printer. The electronic apparatus 200 includes a processing unit 210 (processor), a communication unit 220 (communication interface), a display unit 230 (display), an operation unit 240 (operation panel), a printing unit 250, and a storage unit 260 (memory).

The processing unit 210 (processor, controller) controls each unit of the communication unit 220, the display unit 230, the operation unit 240, the printing unit 250, and the storage unit 260, and collectively controls operations to be executed by the electronic apparatus 200 (printer). In the present embodiment, each processing (each function) to be performed by each unit of the processing unit 210 may be realized by a processor (processor including hardware). For example, in the present embodiment, each processing may be realized by a processor that operates based on information such as a program and a storage device (memory) that stores information such as a program.

The communication unit 220 (wireless communication unit) is realized by at least one communication device (wireless communication device). The communication unit 220 includes a wireless communication device (wireless communication chip) that executes communication based on a BLE standard. Here, the communication unit 220 may include a wireless communication device that executes wireless communication based on a standard other than the BLE standard.

The display unit 230 is configured with a display or the like that displays various kinds of information to a user, and the operation unit 240 is configured with a button or the like that receives an input operation from a user. The display unit 230 and the operation unit 240 may be integrally configured with, for example, a touch panel.

The printing unit 250 includes a printing engine. The printing engine is a mechanical configuration for executing printing of an image on a print medium. The printing engine includes, for example, a transport mechanism, an ink jet type ejection head, and a drive mechanism of a carriage including the ejection head. The printing engine prints an image on a print medium by ejecting an ink from the ejection head onto the print medium (paper or cloth) transported by the transport mechanism. A specific configuration of the printing engine is not limited to the configuration described in the present embodiment, and may be a configuration in which printing is performed with toner by a laser method. In addition, the printing unit 250 may include sensors that detect various kinds of physical quantities related to an operation state of the printing engine, and counters that count detection results, and the like. By using the sensors and the counters, it is possible to acquire information such as a drive amount of the transport mechanism (a rotation amount of the motor), the number of reciprocations of the ejection head, a consumption amount of the ink, and the like.

The storage unit 260 (storage device) is configured with a storage medium such as an HDD, a ROM, or a RAM. The storage unit 260 stores data which is output from the printing unit 250, as information indicating an operation status of the printer.

In addition, the storage unit 260 may store data transmitted from the terminal apparatus 100. For example, the communication unit 220 receives data to be printed by the printing unit 250 from the terminal apparatus 100, and the storage unit 260 stores the data. In this configuration, the data to be printed can be stored in advance in the electronic apparatus 200 (printer), and thus it is possible to reduce a communication load when executing printing. The data to be printed is not necessarily stored in the storage unit 260 included in the electronic apparatus 200. For example, the electronic apparatus 200 may include an interface (not illustrated), and the data to be printed may be stored in an external storage device connected via the interface. For example, the external storage device may be an HDD or a solid state drive (SSD) connected by Universal Serial Bus (USB), may be a flash memory, may be an SD card inserted in a card slot (including a storage device such as a micro SD card with an associated standard), or may be another storage device connectable to the electronic apparatus 200.

2. First Embodiment

First, a first embodiment will be described. Specifically, an example of reference distance setting and display control will be described, and then a method of estimating a distance between the terminal apparatus 100 and the electronic apparatus 200 based on a beacon signal will be described. Thereafter, a flow of processing to be performed by the electronic apparatus 200 will be described with reference to a flowchart of FIG. 7.

2.1 Specific Example of Reference Distance Setting and Display Control According to Distance The electronic apparatus 200 (for example, a multifunction peripheral) having many functions requires a complicated state control. For example, in a multifunction peripheral having a print function, a scan function, a facsimile function, and a copy function, a control of switching between a print function execution state, a scan function execution state, a facsimile function execution state, and a copy function execution state is appropriately performed according to a request from a user. In an example of display control of the display unit 230, display screens (for example, display screens illustrated in FIGS. 11 to 14 to be described) corresponding to each function are prepared, and the processing unit 210 performs processing of displaying a screen corresponding to a current state. At this time, in an operation for state transition, for example, in a home screen (refer to FIG. 10 to be described), when a user is forced to perform an operation of selecting a desired function, from a viewpoint of convenience, there is a problem in that a burden on the user is increased.

In this regard, as disclosed in JP-A-2016-123038, a method of displaying a screen corresponding to a terminal having the strongest reception radio wave intensity of a beacon signal, that is, a screen corresponding to a terminal estimated to be closest to a printer, is considered. In the method disclosed in JP-A-2016-123038, by specifying a terminal (a user) approaching the printer and displaying a screen corresponding to the specified terminal (user), a burden on the user can be reduced.

On the other hand, in the method disclosed in JP-A-2016-123038, specifying the closest terminal and displaying the screen associated with the terminal are merely performed, and as a result, it is difficult to perform a flexible state control according to a state of the user.

For example, in recent years, in the electronic apparatus 200, a demand for power saving is increased. For this reason, by setting a plurality of states with different power consumption and performing a state control between these states, power saving is realized. More specifically, by switching between a state where a function of the electronic apparatus 200 such as a print function is normally used (hereinafter, referred to as a normal operation state) and a power saving state where power consumption is lower than that in the normal operation state, the processing unit 210 reduces power consumption of the electronic apparatus 200. At this time, in some cases, a first power saving state and a second power saving state are set, the first power saving state being a state where power consumption is very small but it takes more time to return to the normal operation state, and the second power saving state being a state where power consumption is larger than that in the first power saving state (smaller than that in the normal operation state) but it is possible to return to the normal operation state at high speed. By setting three or more states including the normal operation state and a plurality of power saving states, it is possible to perform flexible power control considering a balance between power consumption and a return speed. Such a flexible control cannot be easily realized by a simple control of merely specifying the approaching terminal as in JP-A-2016-123038.

As illustrated in FIG. 3, the electronic apparatus 200 according to the present embodiment includes the communication unit 220 that receives a beacon signal from the terminal apparatus 100, the display unit 230, and the processing unit 210 that performs display processing of the display unit 230. In a case where it is determined that the distance between the terminal apparatus 100 and the electronic apparatus 200 is equal to or shorter than a first reference distance, based on a reception radio wave intensity of the beacon signal, the processing unit 210 displays a screen to be displayed to a user of the terminal apparatus 100 from which the beacon signal is transmitted, on the display unit 230, in a first display mode. In addition, in a case where it is determined that the distance is equal to or shorter than a second reference distance, which is shorter than the first reference distance, the processing unit 210 displays a screen to be displayed to a user of the terminal apparatus 100 from which the beacon signal is transmitted, on the display unit 230, in a second display mode different from the first display mode.

Here, the beacon signal is a signal which is transmitted using wireless communication, and is a signal which is used for acquiring information such as a position and confirming the presence of an apparatus. The beacon signal is transmitted, for example, without specifying a transmission destination, and is received by a terminal existing within a range. Here, the beacon signal is a signal based on a Bluetooth communication standard, and specifically, is an advertisement packet which is used for broadcasting data. On the other hand, the beacon signal can be extended to a broadcast signal (SSID broadcast) based on a Wi-Fi communication standard.

In addition, the first reference distance is a reference distance in which a probability that a user of the terminal apparatus 100 uses the electronic apparatus 200 is high to some extent, and is set to a distance of, for example, approximately 1 m to 2 m. The second reference distance is a reference distance in which a probability that a user of the terminal apparatus 100 uses the electronic apparatus 200 is sufficiently high and the display unit 230 is viewed by the user. The second reference distance is set, for example, to a distance of approximately several tens of centimeters. Here, specific numerical values of the first reference distance and the second reference distance may be variously changed.

FIG. 4 is a schematic diagram for explaining the first reference distance and the second reference distance. As illustrated in FIG. 4, in the present embodiment, three regions of a region (R1), a region (R2), and a region (R3) can be set, the region (R1) within a distance equal to or shorter than the second reference distance from the electronic apparatus 200, the region (R2) within a distance longer than the second reference distance and equal to or shorter than the first reference distance from the electronic apparatus 200, and the region (R3) within a distance longer than the first reference distance from the electronic apparatus 200. Based on the reception radio wave intensity of the beacon signal from the terminal apparatus 100, the processing unit 210 can determine a distance from the terminal apparatus 100, that is, one region in which the terminal apparatus 100 is located among the three regions (R1 to R3). Details of distance determination processing will be described later.

Here, the screen to be displayed to the user represents a user display screen linked to the user of the terminal apparatus 100. For example, the processing unit 210 specifies the terminal apparatus 100 that is a transmission source of the beacon signal, based on identification information (refer to FIG. 5 to be described) of the terminal apparatus 100 included in the beacon signal. The processing unit 210 acquires information associated with the terminal apparatus 100 and the user and information associated with the user and the display screen, and selects an appropriate display screen based on the terminal apparatus 100 specified by the beacon signal and the information, as a screen to be displayed to the user. The information associated with the terminal apparatus 100 and the user and the information associated with the user and the display screen may be stored in the storage unit 260 of the electronic apparatus 200, or may be stored in an external device (a server system or the like) which can perform communication with the communication unit 220.

According to the method of the present embodiment, not only the screen corresponding to the user of the terminal apparatus 100 can be displayed, but also display control with three or more stages can be performed according to the distance from the terminal apparatus 100. Specifically, even when a target is the same terminal apparatus 100 (the terminal apparatus 100 associated with the same user), a flexible control according to the distance from the terminal apparatus 100 can be realized. The display can be changed between a case where a given terminal apparatus 100 approaches the electronic apparatus 200 to some extent (enters into the region R2 in FIG. 4) and a case where the terminal apparatus 100 sufficiently approaches the electronic apparatus 200 (enters into the region R1 in FIG. 4). Therefore, it is possible to perform a flexible and complicated control as compared with an example of simply displaying a screen corresponding to a terminal within the shortest distance.

Specifically, in a case where it is determined that the distance is equal to or shorter than the first reference distance and longer than the second reference distance (region R2), the processing unit 210 performs screen generation processing and turn-off processing of a light source of the display unit 230. In a case where it is determined that the distance is equal to or shorter than the second reference distance (region R1), the processing unit 210 performs turn-on processing of the light source. Here, the turn-off processing of the light source includes processing of maintaining a turn-off state of the light source. In an example of FIG. 7 to be described, a case where it is determined that the distance is equal to or shorter than the first reference distance and longer than the second reference distance corresponds to a case where a determination result in S102 is YES but a determination result in S108 is not YES. The processing unit 210 does not perform the turn-on processing of the light source in steps S102 to S108, and thus the light source is maintained in the previous state (turn-off state).

Here, the light source corresponds to, for example, a backlight of a liquid crystal panel. In a case where a front light type liquid crystal panel or an electrophoresis panel is used as the display unit 230, the light source may be a front light type light source. In addition, the light source may be any light source as long as the user can visually recognize the display unit 230 using the light source, and a specific configuration of the light source may be variously modified.

In addition, the screen generation processing may include processing of generating display data to be transmitted to the display unit 230, or processing of driving the display unit 230 based on the display data. For example, in a case where the display unit 230 is a liquid crystal panel, processing of generating a signal for driving driving units (a scanning line driving unit and a data line driving unit) of the liquid crystal panel is regarded as the screen generation processing, or processing of actually driving the driving units is regarded as the screen generation processing. In the latter case, a liquid crystal element transitions to a state corresponding to the image data. Therefore, although viewability is low as compared with a case where the light source of the display unit 230 is turned-on, the screen itself becomes a recognizable state by light from a different light source (for example, an indoor lighting device), and thus the user can view the screen.

In this configuration, when the terminal apparatus 100 approaches the electronic apparatus 200 at a distance equal to or shorter than the first reference distance, a display screen is generated. That is, when a probability that the user uses the electronic apparatus 200 is high to some extent, preparation of a display screen for the user can be started. In a case where preparation for display is performed in advance, when the terminal apparatus 100 approaches the electronic apparatus 200 at a distance equal to or shorter than the second reference distance, it is possible to allow the user to view the screen by only turning-on the light source (backlight). That is, the screen can be displayed at high speed, and thus convenience for the user can be improved. At this time, in a case where the distance is equal to or shorter than the first reference distance and longer than the second reference distance, the light source is turned-off, and thus it is possible to reduce the power consumption in a period of preparation for display. In addition, in a case where the user moves in the vicinity of the electronic apparatus 200 or in a case where the user is away from the electronic apparatus 200 while maintaining a distance longer than the second reference distance, the light source is not turned-on, and thus the power consumption can be reduced. In other words, according to the method of the present embodiment, it is possible to realize a control considering a balance between user convenience and power consumption.

In a case where it is determined that the distance is longer than the first reference distance, or in a case where the beacon signal is not received, the processing unit 210 causes the display unit 230 to transition to a non-display state. The case where the beacon signal is not received is a case where the terminal apparatus 100 does not exist within a range corresponding to a reachable distance of the beacon signal to the electronic apparatus 200. The reachable distance of the beacon signal depends on a transmission radio wave intensity of the beacon signal and an object disposed in the vicinity of the electronic apparatus 200 (another electronic apparatus, a shielding object, or the like). It is assumed that the reachable distance of the beacon signal is a distance of, for example, several tens of meters and is longer than the first reference distance. In a case where the distance is longer than the first reference distance, the beacon signal may be received and the distance between the terminal apparatus 100 and the electronic apparatus 200 may be estimated. In this case, it is determined that the estimated distance is longer than the first reference distance. That is, in a case where there is no terminal apparatus 100 approaching the electronic apparatus 200 within a certain distance, the display unit 230 transitions to a non-display state.

In this manner, in a case where it is determined that the distance between the terminal apparatus 100 and the electronic apparatus 200 is sufficiently long, not only the light source is turned-off, but also the display screen generation processing is skipped. Therefore, in a situation where necessity of displaying a screen is low, it is possible to sufficiently reduce the power consumption related to display.

In the above description, as an example of a control of the display mode, an example in which a control of whether or not to generate a display screen and a control of whether or not to turn-on the light source are performed, is described. Here, the control of the display mode according to the present embodiment is not limited thereto. For example, in a case where it is determined that the distance between the terminal apparatus 100 and the electronic apparatus 200 is equal to or shorter than the first reference distance and longer than the second reference distance, a first display screen may be displayed, and it is determined that the distance between the terminal apparatus 100 and the electronic apparatus 200 is equal to or shorter than the second reference distance, a second display screen different from the first display screen may be displayed. The first display screen and the second display screen are screens with different texts to be displayed, the different number of images (icons), different arrangement, different sizes, and the like.

In addition, in the above example, in a case where it is determined that the distance between the terminal apparatus 100 and the electronic apparatus 200 is equal to or shorter than the first reference distance, processing of displaying a display screen is started. In a broad sense, in a power saving state, in a case where it is determined that the distance is equal to or shorter than the first reference distance, it is considered that the processing unit 210 performs return processing from the power saving state. That is, until the distance between the terminal apparatus 100 and the electronic apparatus 200 becomes equal to or shorter than the first reference distance, the electronic apparatus 200 is in the power saving state, and when it is determined that the distance is equal to or shorter than the first reference distance, in response to the determination result, the electronic apparatus 200 returns to a state where power consumption is larger than at least power consumption in the power saving state. In this configuration, in a case where the probability that the user uses the electronic apparatus 200 becomes high to some extent, the electronic apparatus 200 can be smoothly returned from the power saving state.

It is assumed that a transition from the first power saving state to the second power saving state is also included in "return from the power saving state". In the above example, the return from the power saving state in the present embodiment is realized by a transition (return) from the first power saving state to the second power saving state in response to the determination in which the distance is equal to or shorter than the first reference distance and a transition (return) from the second power saving state to the normal operation state in response to the determination in which the distance is equal to or shorter than the second reference distance. In the above example, the first power saving state is a state where the display unit 230 transitions to a non-display state, the second power saving state is a state where a display screen is generated but the light source of the display unit 230 is turned-off, and the normal operation state is a state where the light source is turned-on and thus a display screen is displayed.

In the above example, a state control in a case where the distance between the terminal apparatus 100 and the electronic apparatus 200 becomes short is described. On the other hand, considering reduction of the power consumption, in a case where the distance between the terminal apparatus 100 and the electronic apparatus 200 becomes longer, preferably, the electronic apparatus 200 transitions again to the power saving state. Therefore, in a state where the electronic apparatus 200 returns from the power saving state, when it is determined that the distance exceeds a third reference distance, the processing unit 210 performs transition processing to the power saving state.

Here, the third reference distance may be common with the first reference distance. In this case, when the distance is equal to or shorter than the first reference distance, the electronic apparatus 200 returns from the power saving state, and when the distance is longer than the first reference distance, the electronic apparatus 200 transitions to the power saving state. For example, in a case where the terminal apparatus 100 moves from the region R1 to the region R2 in FIG. 4, the electronic apparatus 200 transitions from the normal operation state to the second power saving state, and in a case where the terminal apparatus 100 moves from the region R2 to the region R3, the electronic apparatus 200 transitions from the second power saving state to the first power saving state. Thus, in a case where the distance exceeds the first reference distance, the transition to the power saving state is realized. Alternatively, in the transition to the power saving state, a direct transition to the first power saving state may be performed. Specifically, in a case where the terminal apparatus 100 moves from the region R2 to the region R3, the electronic apparatus 200 may transition from the second power saving state to the first power saving state, and in a case where the terminal apparatus 100 moves from the region R1 to the region R3 (via the region R2), the electronic apparatus 200 may directly transition from the normal operation state to the first power saving state without passing through the second power saving state. Here, in the above example, in a case where the distance between the terminal apparatus 100 and the electronic apparatus 200 is close to the first reference distance, when a position of the terminal apparatus 100 slightly changes, a state transition between the power saving state and the return state may be frequently repeated.

For this reason, the third reference distance may be a distance longer than the first reference distance, and for example, a distance of approximately 5 m to 10 m. In this case, after return from the power saving state is once performed, unless it is determined that the user of the terminal apparatus 100 is sufficiently separated from the electronic apparatus 200, a transition to the power saving state is not performed. In this manner, in a situation where it can be clearly determined that the user has no intention to use the electronic apparatus 200, the transition to the power saving state is performed, and thus an inappropriate state transition can be prevented.

The above example is described based on the display control of the display unit 230. As described above, the display control may be a control of a light source or the like considering a control of power consumption, or may be a control of switching the content itself of the display screen irrespective of power consumption.

Here, the method according to the present embodiment can be applied to an apparatus that performs power control without considering a display control. Specifically, the method according to the present embodiment can be applied to a printing apparatus including the communication unit 220 that receives a beacon signal (advertisement packet) based on a Bluetooth communication standard from the terminal apparatus 100, and the processing unit 210. In the power saving state, when it is determined that a distance between the terminal apparatus 100 and the printing apparatus is equal to or shorter than the first reference distance based on a reception radio wave intensity of the beacon signal, the processing unit 210 of the printing apparatus performs return processing from the power saving state. In a state where the printing apparatus is returned from the power saving state, when it is determined that the distance exceeds a given reference distance equal to or longer than the first reference distance, the processing unit 210 of the printing apparatus performs transition processing to the power saving state.

In this manner, by performing the state transition based on distance determination using Bluetooth communication, it is possible to realize a printing apparatus capable of appropriately reducing power consumption. At this time, it is possible to prevent inappropriate state transition by using the first reference distance and a reference distance (corresponding to the third reference distance) equal to or longer than the first reference distance.

In this case, various examples of the return state including the power saving state and the normal operation state are considered. For example, in a case where the processing unit 210 of the printing apparatus includes a processing device (main CPU) that controls a printing operation and a processing device (sub CPU) that performs a control of communication and the like, in the power saving state, the main CPU is in an OFF state, and in the return state, the main CPU is in an ON state. More specifically, in the power saving state, reception (scanning) of a beacon signal (advertisement packet) using Bluetooth may be performed, and an operation of each unit unrelated to the reception processing of the beacon signal may be stopped. As described above, the power saving state is set to a display off state, and the return state is set to a display on state (at least a display screen is generated and the light source is turned-on or turned-off).

2.2 Determination of Distance

Next, processing of determination of a distance based on the reception radio wave intensity of the beacon signal will be described.

FIG. 5 is an example of a data structure of a beacon signal (advertisement packet) transmitted by the terminal apparatus 100. FIG. 5 illustrates a part of the data structure of the beacon signal, and the beacon signal may include other data. In addition, a part of the data in FIG. 5 may be omitted.

As illustrated in FIG. 5, the beacon signal includes a transmission source address, identification information of the terminal apparatus 100, information indicating a radio wave intensity at a reference distance, and use history information of the electronic apparatus 200 by the user. The transmission source address is address information indicating a transmission source of the beacon signal, and is, for example, an address of a Bluetooth apparatus. The identification information of the terminal apparatus 100 is information for uniquely specifying the terminal apparatus 100 as a transmission source, and is, for example, a MAC address. The information indicating a radio wave intensity at a reference distance is information used for estimation of the distance between the terminal apparatus 100 and the electronic apparatus 200 by the processing unit 210. The use history information of the electronic apparatus 200 will be described later in a second embodiment.

The processing unit 210 of the electronic apparatus 200 obtains the distance between the terminal apparatus 100 and the electronic apparatus 200 based on the reception radio wave intensity of the beacon signal. The processing unit 210 compares a received signal strength indication value with a signal strength indication value at a reference distance that is included in the beacon signal. Assuming that a reception apparatus is provided at a position away from an apparatus transmitting a beacon signal by a reference distance, a signal strength indication value at a reference distance is a received signal strength indication (RSSI) value of the beacon signal at the reception apparatus. In an example of using a beacon signal (advertisement packet) based on a BLE standard, the transmission apparatus is a broadcaster and the reception apparatus is an observer. The reference distance is, for example, 1 m, and may be set to a different distance.

FIG. 6 is an example illustrating a relationship between a distance from an apparatus transmitting a beacon signal and a radio wave intensity of the beacon signal received at each distance. Generally, it is known that the radio wave intensity is decreased in inverse proportion to the square of the distance. Thus, when a radio wave intensity at a reference distance (the signal strength indication value) is known, the distance between the terminal apparatus 100 and the electronic apparatus 200 can be calculated based on the radio wave intensity of the actually-received beacon signal. The processing unit 210 stores a relationship expression corresponding to FIG. 6 in the storage unit 260, and calculates a distance by substituting a signal strength indication value at a reference distance and an actually-measured received signal strength indication value into the expression. Alternatively, the processing unit 210 may store the relationship of FIG. 6 as a table (look-up table) in the storage unit 260, and obtain a distance by retrieving appropriate data from the table based on a signal strength indication value at a reference distance and an actually-measured received signal strength indication value. The processing unit 210 compares the obtained distance with the reference distances (the first reference distance to the third reference distance), and executes the above-described control based on the comparison result.

Alternatively, the reference distance of the signal intensity indication value to be included in the beacon signal may be matched with the first reference distance to the third reference distance. For example, in a case where the first reference distance is "1 m", a received signal strength indication value when an observer is provided at a position away from a broadcaster by 1 m is included in the beacon signal.

In this case, the processing unit 210 performs comparison processing of the signal strength indication value and a received signal strength indication value of the beacon signal. When the received signal strength indication value is equal to or larger than the signal strength indication value as a reference, it can be determined that the distance between the terminal apparatus 100 and the electronic apparatus 200 is equal to or shorter than the first reference distance, and when the received signal strength indication value is smaller than the signal strength indication value as a reference, it can be determined that the distance between the terminal apparatus 100 and the electronic apparatus 200 is longer than the first reference distance. The same is true for the second reference distance and the third reference distance. The beacon signal includes information indicating the received signal strength indication value when an observer is provided at a position away from a broadcaster by the second reference distance (third reference distance). Thus, by the comparison processing of the signal strength indication value and the received signal strength indication value of the beacon signal, it is determined whether or not the distance is equal to or shorter than the second reference distance (third reference distance). That is, in the present embodiment, "a case where it is determined that the distance between the terminal apparatus 100 and the electronic apparatus 200 is equal to or shorter than the reference distance" includes a case where the determination is made by actually obtaining the distance using an expression or a table, and also includes a case where the determination is made based on comparison processing of radio wave intensity values (signal strength indication values).

2.3 Details of Processing

Figure 7:
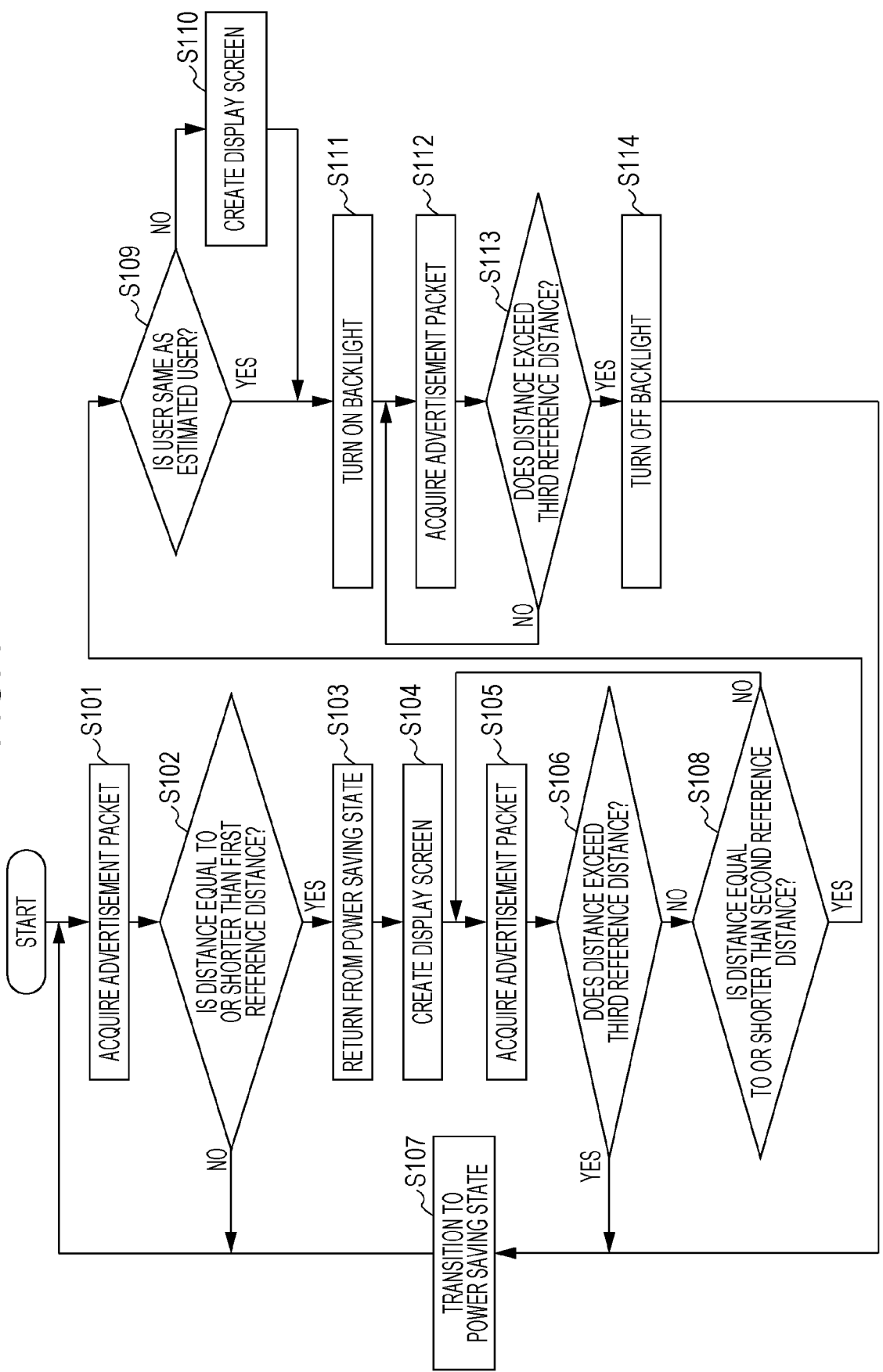
FIG. 7 is a flowchart for explaining processing according to the first embodiment.

FIG. 7 is a flowchart illustrating processing of the electronic apparatus 200 according to the present embodiment. When processing is started, the electronic apparatus 200 starts reception of a beacon signal (scanning of an advertisement packet) (S101). In a case where a beacon signal is received, the electronic apparatus 200 determines whether or not a distance from the terminal apparatus 100 as a transmission source is equal to or shorter than the first reference distance, based on the beacon signal (S102). In a case where the distance is longer than the first reference distance (NO in S102), the electronic apparatus 200 returns to S101 and continues reception of a beacon signal.

In a case where it is determined that the distance between the terminal apparatus 100 and the electronic apparatus 200 is equal to or shorter than the first reference distance (YES in S102), the electronic apparatus 200 returns from the power saving state (S103), and generates a display screen for a user of the terminal apparatus 100 (S104). Here, at this step, the light source of the display unit 230 maintains a turn-off state. In the processing of S104, as will be described in a second embodiment, the display screen may be generated based on analysis processing of a use situation of the user (processing illustrated in a flowchart of FIG. 16 to be described).

After the processing of S104, the electronic apparatus 200 receives a beacon signal (S105), and determines whether or not a distance from the terminal apparatus 100 exceeds the third reference distance (S106). In a case where it is determined that the distance exceeds the third reference distance (YES in S106), the electronic apparatus 200 transitions to the power saving state (S107) and returns to S101. The case of YES in S106 corresponds to a situation where the user moves away from the electronic apparatus 200.

In a case where the distance from the terminal apparatus 100 is equal to or shorter than the third reference distance (NO in S106), the processing unit 210 determines whether or not the distance is equal to or shorter than the second reference distance (S108). In a case where the distance is longer than the second reference distance (NO in S108), the processing unit 210 returns to S105 and continues reception of a beacon signal.

In a case where the distance between the terminal apparatus 100 and the electronic apparatus 200 is equal to or shorter than the second reference distance (YES in S108), the processing unit 210 determines that a user approaches the electronic apparatus 200 closer. Specifically, the processing unit 210 determines whether or not a user of the terminal apparatus 100 with a determination result of YES in S108 is the same as the user for whom the display screen is generated in S104 (S109). In S109, the processing unit 210 performs processing of specifying a terminal apparatus 100 (first terminal apparatus) as a transmission source of the beacon signal used in the determination of YES in S102, and processing of specifying a terminal apparatus 100 (second terminal apparatus) as a transmission source of the beacon signal used in the determination of YES in S108. Specifically, the specifying processing is performed using the identification information of the terminal apparatus 100 included in the beacon signal. The processing unit 210 determines whether or not a user corresponding to the first terminal apparatus is the same as a user corresponding to the second terminal apparatus. Alternatively, the processing unit 210 may determine whether or not the first terminal apparatus and the second terminal apparatus are the same apparatus.

In a case where the users are the same (YES in S109), the display screen prepared in S104 can be used as it is, and thus the processing unit 210 turns on the light source (backlight) of the display unit 230 (S111). In a case where the users are not the same (NO in S109), the display screen prepared in S104 is a screen for a user different from the user who actually approaches the electronic apparatus 200 at a distance equal to or shorter than the second reference distance. Thus, the processing unit 210 generates a display screen for the user of the second terminal apparatus (S110), and then turns on the light source of the display unit 230 (S111).

Thereafter, the electronic apparatus 200 restarts reception of a beacon signal (S112), and determines whether or not a distance from the terminal apparatus 100 exceeds the third reference distance (S113). In a case where it is determined that the distance from the terminal apparatus 100 is equal to or shorter than the third reference distance (NO in S113), the processing unit 210 returns to S112. In a case where it is determined that the distance exceeds the third reference distance (YES in S113), the electronic apparatus 200 turns off the light source of the display unit 230 (S114), transitions to the power saving state (S107), and returns to S101.

3. Second Embodiment

Next, a second embodiment will be described. First, an example of setting the reference distance will be described, and then a specific example of the display control will be described. Thereafter, a flow of processing performed in the electronic apparatus 200 will be described with reference to FIGS. 15 and 16.

3.1 Specific Example of Reference Distance

Figure 8:
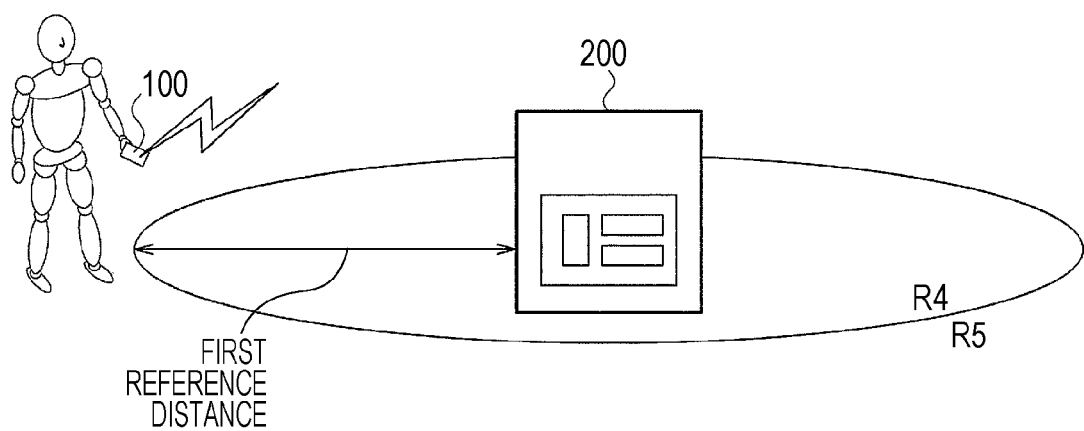
FIG. 8 is a schematic diagram for explaining a reference distance according to a second embodiment.

FIG. 8 is a schematic diagram for explaining a reference distance (first reference distance) according to the present embodiment. As illustrated in FIG. 4, in the present embodiment, two regions of a region (R4) and a region (R5) are set, the region (R4) within a distance equal to or shorter than a first reference distance from the electronic apparatus 200, and the region (R5) within a distance longer than the first reference distance from the electronic apparatus 200. Based on the reception radio wave intensity of the beacon signal from the terminal apparatus 100, the processing unit 210 can determine a distance from the terminal apparatus 100, that is, one region in which the terminal apparatus 100 is located among the two regions. Processing of determining the distance is the same as that in the first embodiment.

In the present embodiment, at least one reference distance may be set, and two or more reference distances may be set as in the first embodiment. In addition, the first reference distance according to the present embodiment is not limited to the same distance as the first reference distance according to the first embodiment, and a specific numerical value of the first reference distance may be variously changed. For example, the first reference distance according to the present embodiment may be a distance that is approximately the same as the second reference distance according to the first embodiment (approximately several tens of centimeters).

In JP-A-2016-123038, a screen to be displayed is a customized screen which is stored in advance in association with a terminal (user). For this reason, in a case where terminals have the strongest radio wave intensity and the terminals (users) as display control targets are the same, there is a problem that the screen to be displayed is fixed.

As illustrated in FIG. 3, the electronic apparatus 200 according to the present embodiment includes the communication unit 220 that receives a beacon signal from the terminal apparatus 100, the display unit 230, and the processing unit 210 that performs display processing of the display unit 230. In a case where it is determined that the distance from the terminal apparatus 100 is equal to or shorter than the first reference distance based on the reception radio wave intensity of the beacon signal, the processing unit 210 determines (generates) a screen to be displayed to the user of the terminal apparatus 100 from which the beacon signal is transmitted based on at least one of authentication job information of the user of the terminal apparatus 100 from which the beacon signal is transmitted, use history information of the user, and user type information, and performs processing displaying the determined screen on the display unit 230.

According to the method of the present embodiment, it is possible to dynamically determine a display screen. Therefore, it is possible to realize a flexible display control according to a status of the terminal apparatus 100 (a situation of the user). In the method according to the present embodiment, a display screen is selected (determined or generated) according to a status of the terminal apparatus 100, and thus, depending on the status of the terminal apparatus 100, the same display screen can be continuously displayed. Hereinafter, a display control using three pieces of information will be described in detail.

3.2 Authentication Printing

First, an authentication job will be described. Here, the authentication job represents a job requiring user authentication when executing a job in the electronic apparatus 200. In the following description, an example in which the electronic apparatus 200 is a printer and the authentication job is an authentication printing job will be described. On the other hand, the authentication job according to the present embodiment can be extended to a job other than printing.

Figure 9:
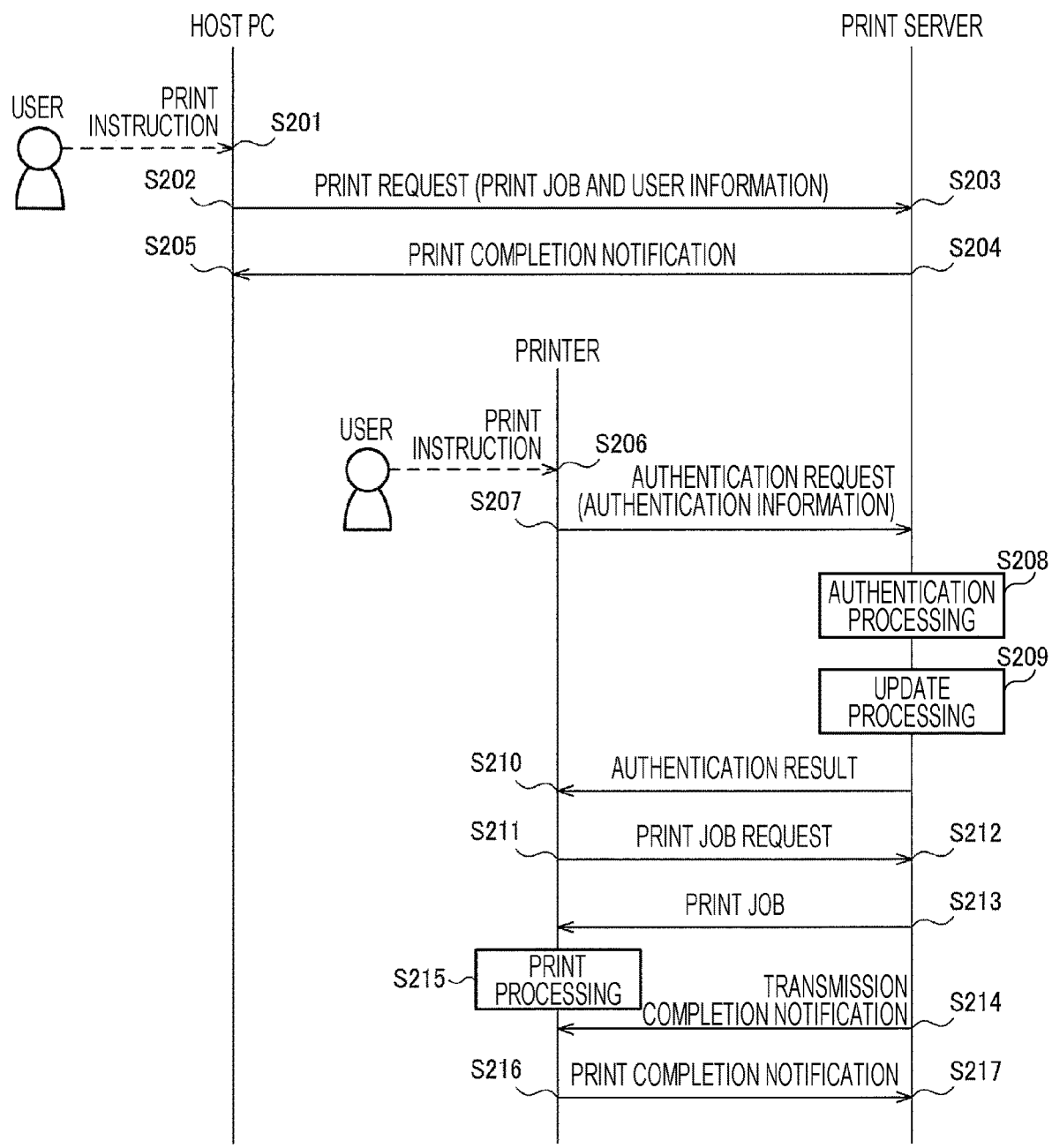
FIG. 9 is a sequence diagram for explaining authentication printing processing.

FIG. 9 is a diagram illustrating an operation sequence of a system including a printer (electronic apparatus 200) in a case of performing authentication printing. FIG. 9 is an example of authentication printing processing, and various modifications such as omission of partial processing of FIG. 9, addition of other processing, or change of a processing order may be made.

In FIG. 9, a host PC is an apparatus that requests the printer to print the data to be printed. A print server is a server that is connected to a plurality of printers and controls an operation of each printer. In authentication printing, a print server separate from the printer is provided in many cases. On the other hand, one or more printers among the plurality of printers may include an internal server, and the internal server may operate as a print server. The host PC, the print server, and the printer are connected to each other via a network such as a LAN.

First, the host PC receives a print instruction for designating the print server as a transmission destination of a print job, from a user (S201). Specifically, the host PC receives a print instruction from the user via a print setting screen, and acquires print setting, data to be printed, and user information. Here, the user information is, for example, a user ID. The host PC generates a print job including the print setting and the data to be printed that are acquired in S201, and transmits a print request including the job and the user information to the print server (S202).

The print server receives the print request from the host PC (S203), and transmits a print completion notification to the host PC (S204). The host PC receives the print completion notification, and ends processing related to printing instructed in S201 (S205).

The printer (the processing unit 210 of the electronic apparatus 200, a printing control unit) receives a print instruction from the user who performs the print instruction in S201 (S206). Specifically, the printer receives input of authentication information and a print instruction from the user via the operation unit 240. Alternatively, card authentication using NFC may be performed. In this case, the printer includes a card reader, and in a case where the user performs an operation to hold an authentication card to the card reader, the printer acquires the authentication information via the card reader. Here, it is assumed that the authentication information is a user ID and a password. The printer transmits an authentication request including the authentication information acquired in S206 to the print server (S207).

The print server executes authentication processing (S208). Specifically, the print server acquires the authentication information included in the authentication request transmitted from the printer. The print server performs authentication by comparing the acquired authentication information (user ID and password) with authentication information which is stored in advance. The print server transmits an authentication result (pass or failure) to the printer. The print server may perform authentication in cooperation with another authentication server connected via a network.

The print server updates the user information for the user who passes the authentication in S208 (S209). For example, in a case where authentication of a registered user is passed, the print server updates an authentication expiration date, and in a case where a target user is not registered, the print server performs new registration of the user.

The printer receives the authentication result from the print server (S210), and in a case where the authentication of the user who performs the print instruction in S206 is passed, the printer transmits a print job request for acquiring a print job of the user, to the print server (S211). In a case where the authentication is failed, the printer displays, for example, information indicating that the authentication is failed, or displays information indicating that input of authentication information is required again.

The print server receives the print job request from the printer (S212), acquires a print job indicated by the print job request from a spool destination, and transmits the print job to the printer (S213). When transmission of the print job is completed, the print server transmits a transmission completion notification to the printer (S214).

The printer receives the print job from the print server and executes printing of the print data generated based on the print job (S215). In a case where the printing processing is completed, the printer transmits a print completion notification to the print server (S216). The print server receives the print completion notification, and ends processing related to the print job requested in S211 (S217).

When performing the processing illustrated in FIG. 9, in the printing processing (S215) by the printer, the authentication processing (S208) of the user is requested. Therefore, a printed matter is prevented from being remained or removed, and thus it is possible to improve security.

Here, as illustrated in S207 of FIG. 9, in order to realize authentication printing, an operation of the user for inputting the authentication information is required. Specifically, after the print instruction from the host PC is executed, the user moves in the vicinity of the printer and inputs the authentication information by operating the operation unit 240 (operation panel) of the printer. When inputting the authentication information, there is a case where the user is required to perform an operation of selecting a job requesting printing from a print job list stored in the print server. In addition, for input of the authentication information, there is a case where the user is required to perform a transition operation from a home screen to a job selection screen.

Therefore, in the present embodiment, in a case where it is determined that setting for performing the authentication processing is enabled in an execution of a job and it is determined that there is a job corresponding to the user linked to the terminal apparatus 100 at a distance equal to or shorter than the first reference distance based on the authentication job information, the processing unit 210 performs processing of displaying a job selection screen on the display unit 230.

Here, the authentication job information includes information for specifying a job requiring authentication processing and information for specifying a user associated with the job. In a case of the example of the authentication printing illustrated in FIG. 9, the authentication job information corresponds to the print job information and the user information, which are transmitted to the print server in S203 and are used for the authentication processing in S208. Whether or not there is a job corresponding to the user is determined by processing of specifying a user (first user) linked to the terminal apparatus 100 at a distance equal to or shorter than the first reference distance, processing of specifying a user (second user) associated with the authentication job, and comparison processing (identical determination processing) of the first user and the second user. The processing of specifying the first user is performed based on the identification information of the terminal apparatus 100 included in the beacon signal and correspondence information of the terminal apparatus 100 and the user. The processing of specifying the second user is performed based on the user information stored in the print server.

The processing of specifying the first user, the processing of specifying the second user, and the comparison processing of the first user and the second user may be executed by the printer, may be executed by the print server, or may be executed by the printer and the print server. As an example, the printer specifies the first user based on the beacon signal and transmits the specified information to the print server. The print server determines whether or not there is a job corresponding to the user using the specified information of the first user and the user information received and stored in the processing of S203 (the processing of specifying the second user and the comparison processing), and transmits a determination result to the printer.

In a case where the user for whom an authentication job exists approaches the printer, it is estimated that the user intends to execute the authentication job (in FIG. 9, the print instruction in S206 and the authentication request in S207). Therefore, in a case where it is determined that the terminal apparatus 100 of the user for whom the authentication job exists approaches the electronic apparatus 200 at a distance equal to or shorter than the first reference distance, the processing unit 210 displays an execution screen of the authentication job associated with the user, on the display unit 230.

In this manner, a user can easily request an execution of the authentication job without performing a complicated operation, and thus it is possible to improve convenience of a user.

3.3 Use History

Figure 10:
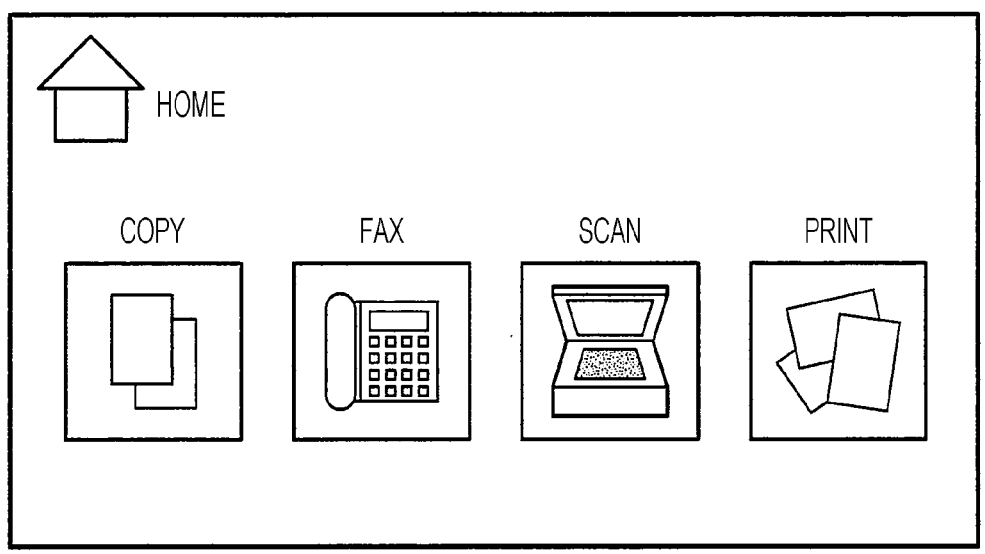
FIG. 10 is an example of a home screen to be displayed on a display unit of the electronic apparatus.

FIG. 10 is an example of a home screen of the electronic apparatus 200 (printer). A plurality of functions of the electronic apparatus 200 are displayed on the home screen, and when one of the functions is selected, transition from the home screen to a display screen related to the selected function is performed. In the example of the home screen in FIG. 10, a copy function, a facsimile function, a scan function, and a print function can be selected.

Figure 11:
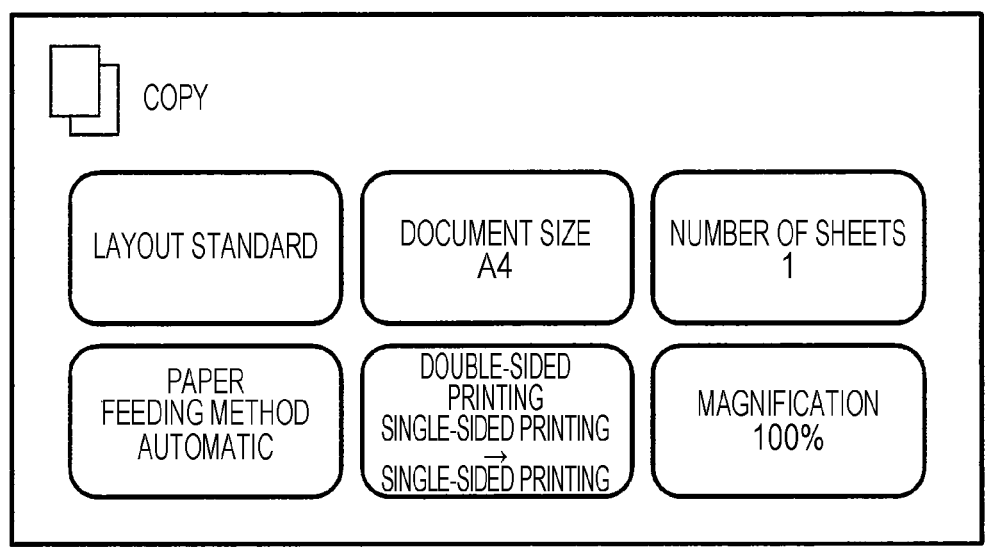
FIG. 11 is an example of a copy screen to be displayed on the display unit of the electronic apparatus.
Figure 12:
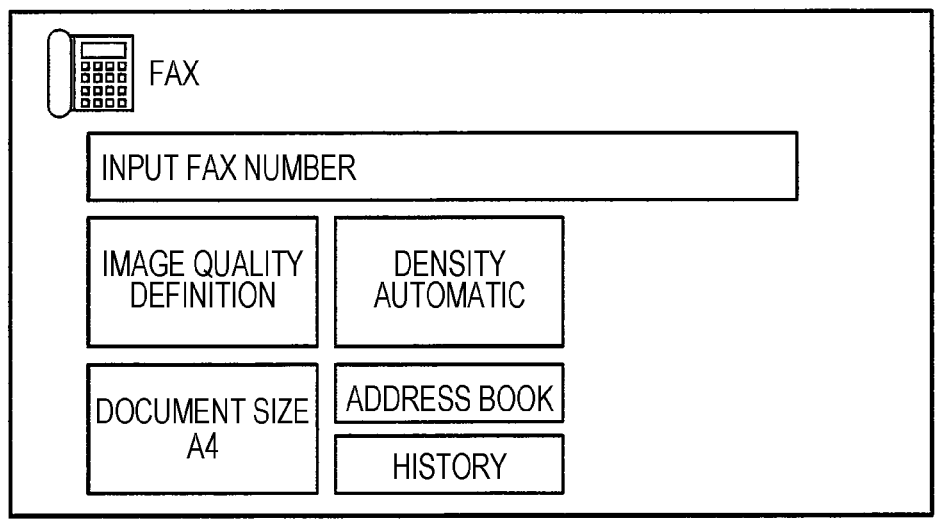
FIG. 12 is an example of a facsimile screen to be displayed on the display unit of the electronic apparatus.
Figure 13:
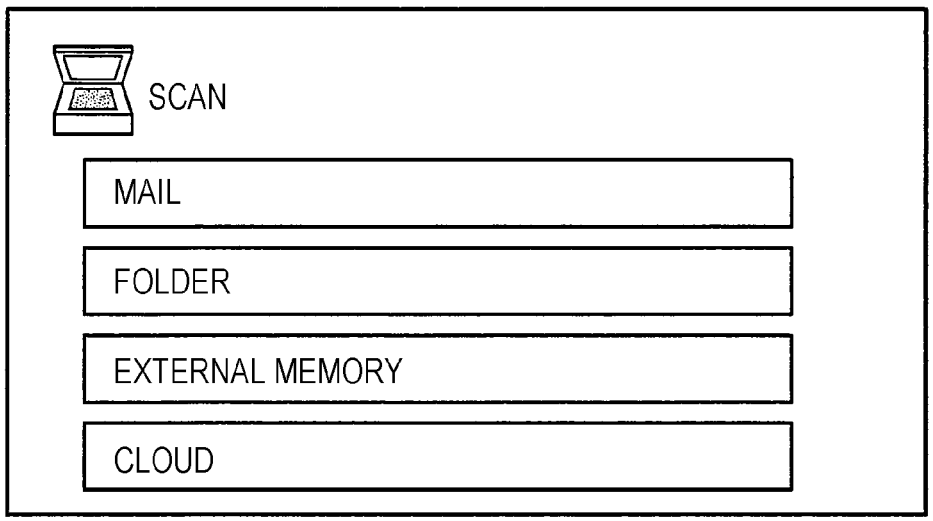
FIG. 13 is an example of a scan screen to be displayed on the display unit of the electronic apparatus.
Figure 14:
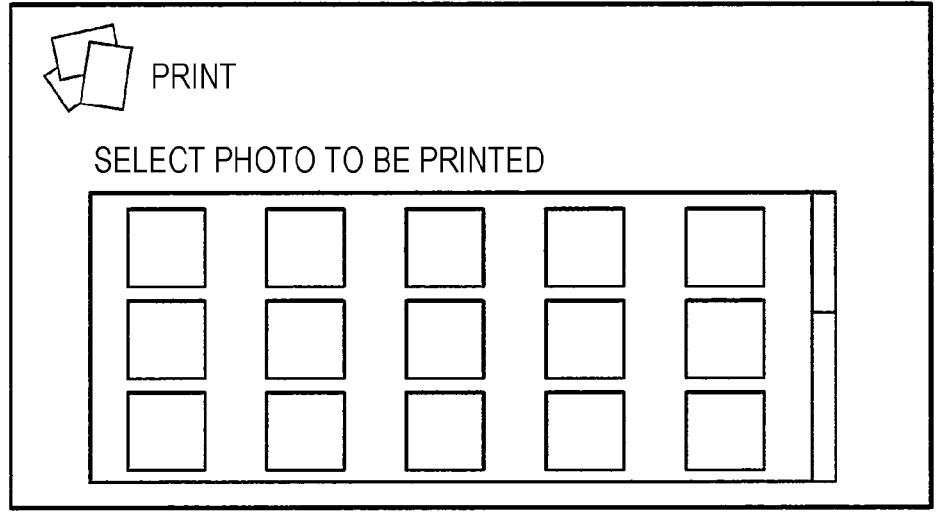
FIG. 14 is an example of a print screen to be displayed on the display unit of the electronic apparatus.

FIG. 11 is a display screen related to the copy function, and various setting information related to the copy function, such as layout and a document size, is displayed. Each setting can be changed by touching a button or the like. FIG. 12 is a display screen related to the facsimile function, and various setting information related to the facsimile function, such as an input field of a destination facsimile number, image quality, density, and a document size, is displayed. Each setting can be changed by touching a button or inputting a number. FIG. 13 is a display screen related to the scan function, and a button for selecting a storage destination (transmission destination) of scanned data and the like are displayed. The storage destination (transmission destination) is determined by the touched button. FIG. 14 is a display screen related to the print function, and thumbnails of candidate print data (photo data) are displayed side by side. In a case where a user selects and determines one photo, a print job is executed.

Normally, after the electronic apparatus 200 is activated, the home screen of FIG. 10 is first displayed, and in a case where one function on the home screen is selected, transition from the home screen to each screen of FIG. 11 to FIG. 14 is performed. For this reason, even in a case where a user frequently uses a specific function, a transition operation from the home screen of FIG. 10 to a screen corresponding to the function is required, and as a result, there is a problem in convenience.

In addition, even in the method disclosed in JP-A-2016-123038 or the like, although display of the home screen is skipped and one of the screens of FIGS. 11 to 14 may be directly displayed, it is difficult to flexibly change functions to be displayed. For example, a use frequency of the facsimile function is high for a given user until a certain point of time, and on the other hand, a use frequency of the scan function may become high after the point of time. In this way, even for the same user, a function with a high use frequency may be changed with an elapse of time. In JP-A-2016-123038, a method of processing such a change is not sufficiently disclosed. For example, a user him/herself is required to change a screen (customized screen) to be displayed.

Therefore, in the present embodiment, the processing unit 210 of the electronic apparatus 200 acquires use history information of the user linked to the terminal apparatus 100 from which the beacon signal is transmitted based on the beacon signal, selects one function among the plurality of functions of the electronic apparatus 200 based on the use history information, and displays a screen corresponding to the selected function on the display unit 230.

Here, the use history information of the user is information indicating a use history of the electronic apparatus 200 by the user. The use history information is, for example, time-series information in which a use time of the electronic apparatus 200 by the user and a function used at the time are associated with each other. Here, data after certain processing (statistical processing) may be used as the use history information such that the number of uses of each function in a predetermined period is used as history information, and a data structure of the use history information can be variously changed.

In the present embodiment, the processing unit 210 dynamically selects (generates) a display screen based on the use history information at a time when the distance from the terminal apparatus 100 is equal to or shorter than the first reference distance. Therefore, it is possible to appropriately display a screen according to a situation of the user at that time. For example, as in the above example, in a case where a function with a high use frequency changes from the facsimile function to the scan function, a screen which is selected to be displayed is changed from the screen of FIG. 12 to the screen of FIG. 13 without forcing the user to perform an explicit operation.

In addition, the use history information according to the present embodiment may include more detailed information. For example, as the use history information, setting history information of each function may be used. In a case of the copy function, a document size, magnification, and the like when performing copying are included in the use history information. In a case of the facsimile function, a facsimile number as a transmission destination is included in the use history information. The processing unit 210 may perform processing of displaying a display screen based on the more detailed use history information. Specifically, in the copy function, a document size selected in the initial state is changed based on the use history information of the user, or in the facsimile function, a facsimile number with a high use frequency is input in advance in the input field of the facsimile number. In this way, a display screen may be variously changed.

3.4 User Type

In addition to a general user who uses the functions of the electronic apparatus 200, a user who operates the electronic apparatus 200 is a user in charge of maintenance of the electronic apparatus 200. For example, an employee of a manufacturer of the electronic apparatus 200 or a professional staff (service person) who receives a request from the manufacturer is a user who performs maintenance of the electronic apparatus 200.

In the maintenance of the electronic apparatus 200, it is assumed that a dedicated maintenance screen is used. For this reason, in a case where a user who performs maintenance operates the electronic apparatus 200, it is assumed that maintenance is firstly executed using the maintenance screen, and it is considered that a use priority of each screen illustrated in FIGS. 11 to 14 is low.

Therefore, the processing unit 210 of the electronic apparatus 200 acquires, as user type information, information indicating whether or not the user linked to the terminal apparatus 100 from which the beacon signal is transmitted is a user who performs maintenance, based on the beacon signal. For example, the processing unit 210 assigns dedicated user identification information, which is different from user identification information assigned to a general user, to a user who performs maintenance, and determines that a target user is a user who performs maintenance in a case where the identification information of the terminal apparatus 100 is associated with the dedicated user identification information. Here, the user type information is the dedicated user identification information, and the electronic apparatus 200 may determine whether or not the user is a user who performs maintenance. Alternatively, the electronic apparatus 200 may transmit the identification information of the terminal apparatus 100 included in the beacon signal, to an external apparatus (server system or the like), and the external apparatus may perform matching with the user identification information, and acquire information indicating a matching result as user type information.

The processing unit 210 performs processing of displaying a maintenance screen on the display unit 230 in a case where the user is a user who performs maintenance. In this manner, it is possible to improve convenience without forcing a user who performs maintenance to perform a complicated operation. In particular, it is considered that the maintenance screen has a very low use frequency by general users, and as a result, it is not easy to perform a transition from the home screen (for example, required operations are complicated or the number of passing screens is increased). In this regard, in the method according to the present embodiment, even in a case of the user who performs maintenance, it is possible to perform display considering convenience of the user.

3.5 Details of Processing

Figure 15:
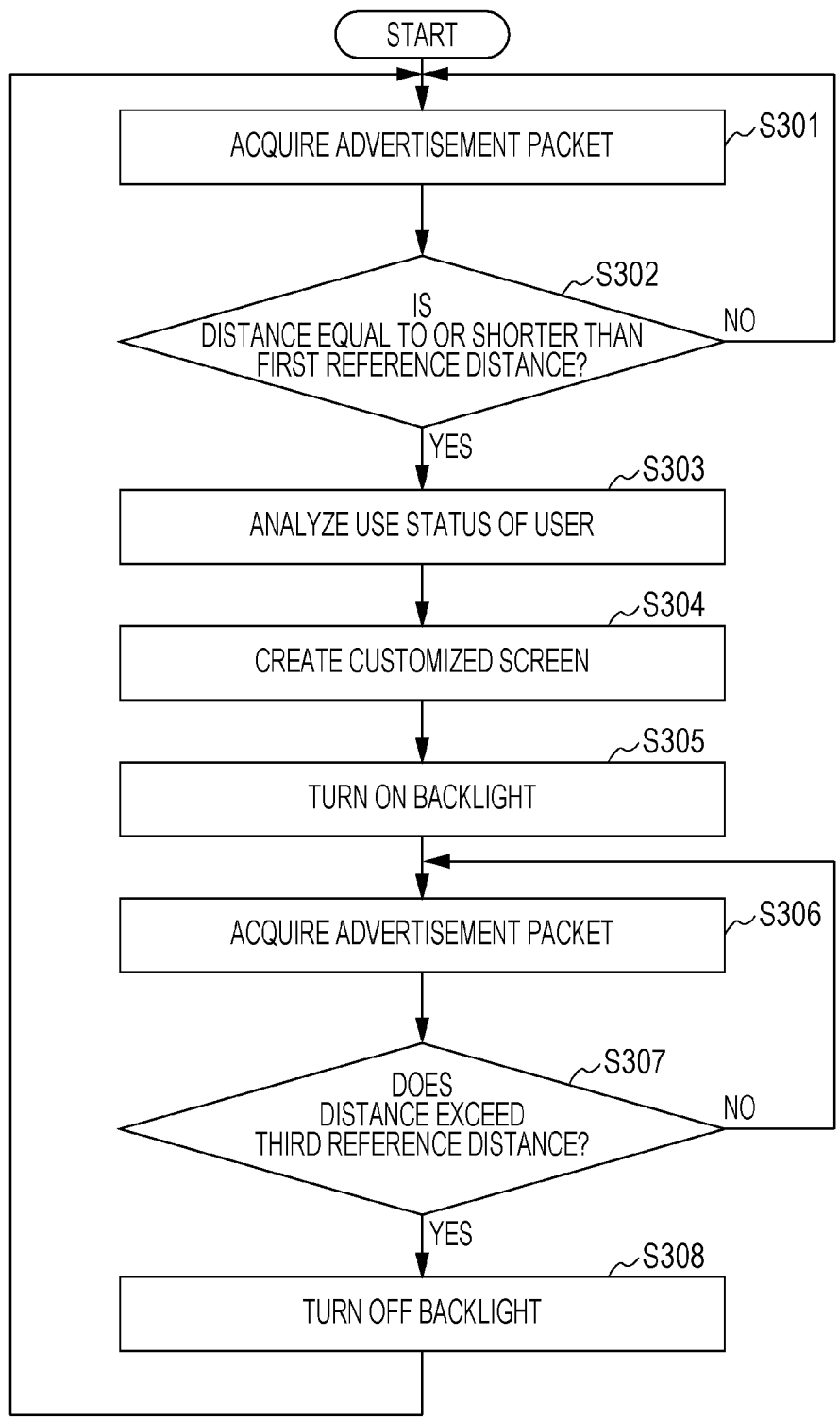
FIG. 15 is a flowchart for explaining processing according to the second embodiment.

FIG. 15 is a flowchart illustrating processing of the electronic apparatus 200 according to the present embodiment. When processing is started, the electronic apparatus 200 starts reception of a beacon signal (scanning of an advertisement packet) (S301). In a case where a beacon signal is received, the electronic apparatus 200 determines whether or not a distance from the terminal apparatus 100 as a transmission source is equal to or shorter than the first reference distance, based on the beacon signal (S302). In a case where the distance is longer than the first reference distance (NO in S302), the electronic apparatus 200 returns to S301 and continues reception of a beacon signal.

In a case where it is determined that the distance from the terminal apparatus 100 is equal to or shorter than the first reference distance (YES in S302), the electronic apparatus 200 analyzes a use situation of the user (S303), and generates a display screen for a user of the terminal apparatus 100 (S304). Further, the processing unit 210 turns on the light source (backlight) of the display unit 230 (S305).

Thereafter, the electronic apparatus 200 restarts reception of a beacon signal (S306), and determines whether or not a distance from the terminal apparatus 100 exceeds the third reference distance (S307). In a case where it is determined that the distance is equal to or shorter than the third reference distance (NO in S307), the electronic apparatus 200 returns to S306 and continues reception of a beacon signal. In a case where it is determined that the distance exceeds the third reference distance (YES in S307), the electronic apparatus 200 turns off the light source of the display unit 230 (S308), and returns to S301.

Figure 16:
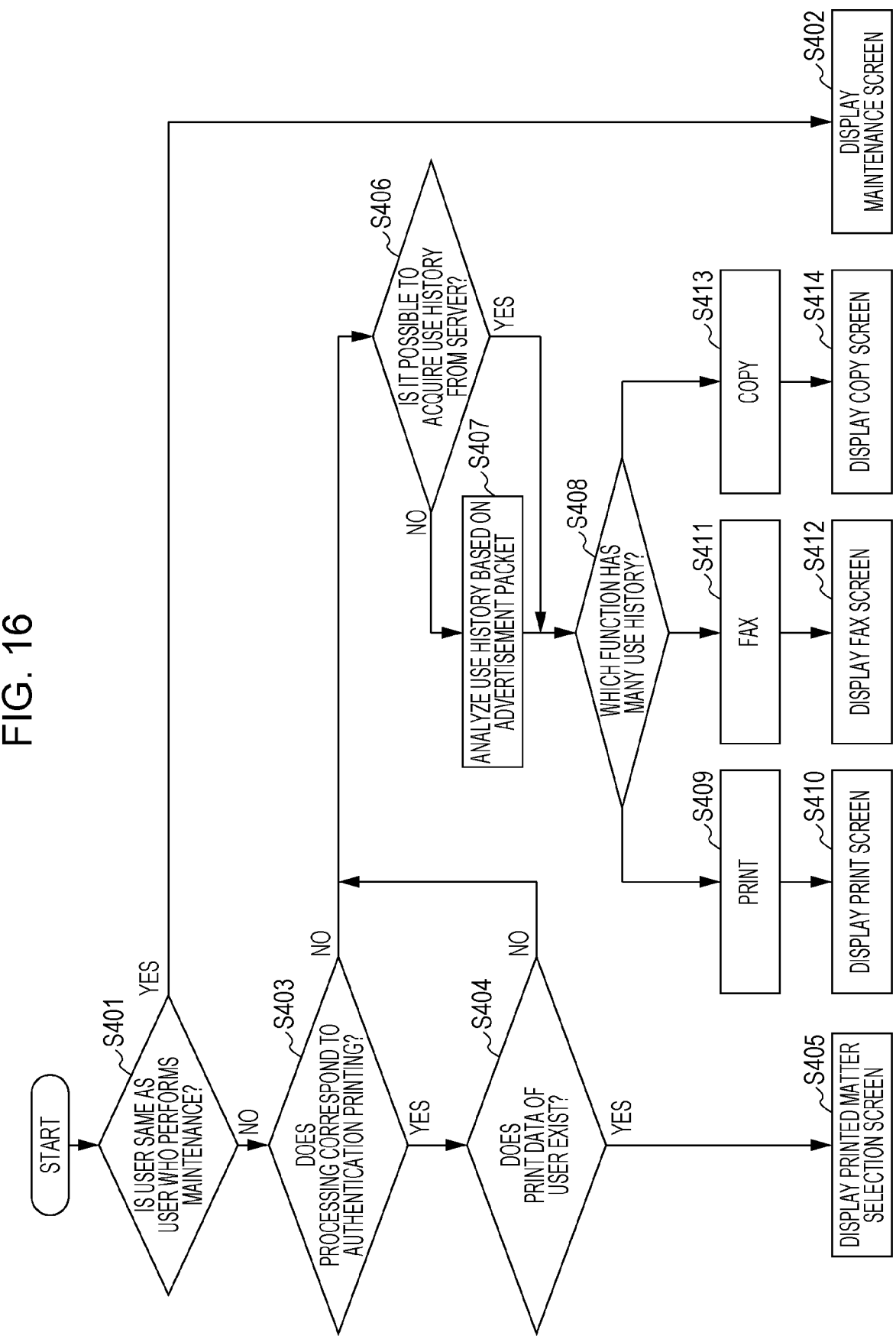
FIG. 16 is a flowchart for explaining processing of determining a display screen corresponding to a user.

FIG. 16 is a flowchart for explaining details of the processing of S303 and S304 in FIG. 15. When the processing is started, the processing unit 210 determines whether or not the user of the terminal apparatus 100 as being determined that the distance is equal to or shorter than the first reference distance in S302 is a user who performs maintenance (S401). In a case where the user of the terminal apparatus 100 is a user who performs maintenance (YES in S401), the processing unit 210 determines a maintenance screen as a display target (S402).

In a case where the user of the terminal apparatus 100 is not a user who performs maintenance (NO in S401), the electronic apparatus 200 determines whether or not an execution of the authentication job is set to an enable mode (S403). In the example of the printer, the processing of S403 corresponds to the determination as to whether or not authentication printing is set to be enabled. In a case where an execution of the authentication job is enabled (YES in S403), the electronic apparatus 200 determines whether or not there is an authentication job (print data) corresponding to the user of the terminal apparatus 100 as being determined that the distance is equal to or shorter than the first reference distance in S302 (S404). In a case where there is an authentication job, the electronic apparatus 200 determines a job selection screen (printed-matter selection screen) as a display target (S405).

In a case where an execution of the authentication job is set to be disabled in the electronic apparatus 200 (NO in S403, including a case where the electronic apparatus 200 does not correspond to authentication processing originally), or in a case where an execution of the authentication job is set to be enabled but there is no authentication job corresponding to the user (NO in S404), the electronic apparatus 200 transitions to processing of determining a display screen based on the use history. Specifically, the electronic apparatus 200 determines whether or not the use history information can be acquired from an external server system (S406).

In a case where the use history information can be acquired (YES in S406), the processing unit 210 analyzes a use history of the user based on the information from the server system, and in a case where the use history information cannot be acquired (NO in S406), the processing unit 210 performs analysis of a use history based on the beacon signal received in S301 (S407). In a case of performing processing of S407, after the use history information is acquired, as illustrated in FIG. 5, the terminal apparatus 100 is required to perform processing of transmitting a beacon signal including the use history information.

The processing unit 210 specifies a function of the electronic apparatus 200 with the large number of uses by the target user based on the analysis of the use history (S408). In a case where the number of uses of the print function is large, the processing unit 210 determines, for example, the print screen illustrated in FIG. 14 as a display target (S409 and S410). In a case where the number of uses of the facsimile function is large, the processing unit 210 determines, for example, the facsimile screen illustrated in FIG. 12 as a display target (S411 and S412). In a case where the number of uses of the copy function is large, the processing unit 210 determines, for example, the copy screen illustrated in FIG. 11 as a display target (S413 and S414). Although not illustrated in FIG. 16, when the electronic apparatus 200 has the scan function, the processing unit 210 may determine the screen of FIG. 13 as a display target.

4. Modification Example

In the first embodiment and the second embodiment described above, an example in which there is one terminal apparatus 100 as being determined that the distance is equal to or shorter than a reference distance, that is, one terminal apparatus 100 for which a screen is to be displayed. Here, depending on setting of the reference distance or a use status of the electronic apparatus 200, there is a possibility that a plurality of terminal apparatuses 100 approach the electronic apparatus 200 at a distance equal to or shorter than the reference distance at the same time. For example, in a case where the electronic apparatus 200 is a business printer provided in an office and the first reference distance is a distance of approximately 1 m to 2 m as in the first embodiment, in a range of approximately 1 m to 2 m from the printer, it is sufficiently considered that there are a plurality of users carrying the terminal apparatuses 100. In this case, it is not preferable to simultaneously display screens corresponding to the plurality of terminal apparatuses 100 (the plurality of users) from a viewpoint of a size of the display unit 230 and convenience of the user. For this reason, it is necessary to determine one display target. In this regard, a method for setting the user of the terminal apparatus 100 with the strongest radio wave intensity as a display target, is considered. On the other hand, as in the example of the above-described office, a user who does not intend to use the electronic apparatus 200 often moves in the vicinity of the electronic apparatus 200 accidentally, and it is unclear whether or not the user of the terminal apparatus 100 with the strongest radio wave intensity intends to use the electronic apparatus 200.

In the present modification example, in a case where it is determined that setting for performing authentication processing is enabled in an execution of a job and it is determined that there are a plurality of terminal apparatuses 100 at the distance equal to or shorter than the first reference distance, the processing unit 210 performs processing of specifying any one of the terminal apparatuses 100 based on the authentication job information, and displaying the screen corresponding to the specified terminal apparatus 100 (screen to be displayed to the user of the specified terminal apparatus 100) on the display unit 230.

As described above with reference to FIG. 9, in a case where the authentication job (authentication printing) is set to be enabled, a user who requests an execution of the authentication job needs to move to the electronic apparatus 200 and input the authentication information. That is, a user, for whom the authentication job exists and who approaches the electronic apparatus 200 at a distance equal to or shorter than the first reference distance, has a high probability of using the electronic apparatus 200, as compared with a user who does not request an execution of the authentication job.

The processing unit 210 determines the number of authentication job corresponding terminal apparatuses, each of which is the terminal apparatus 100 as being determined that the distance is equal to or shorter than the first reference distance and determined that the job corresponding to the user linked to the terminal apparatus 100 is present based on the authentication job information. In a case where there is only one authentication job corresponding terminal apparatus, the processing unit 210 performs processing of displaying the screen corresponding to the authentication job corresponding terminal apparatus on the display unit 230. In a case where there are a plurality of authentication job corresponding terminal apparatuses, the processing unit 210 performs processing of displaying the screen corresponding to the terminal apparatus 100 with the strongest radio wave intensity of the beacon signal among the plurality of authentication job corresponding terminal apparatuses, on the display unit 230.

In this manner, it is possible to select the user of the authentication job corresponding terminal apparatus as a display target in preference to the user of the other terminal apparatus 100. At this time, when there is only one authentication job corresponding terminal apparatus, the user of the one authentication job corresponding terminal apparatus may be selected as a display target. In a case where there are a plurality of authentication job corresponding terminal apparatuses, it is difficult to specify the terminal apparatus 100 of the user who operates the electronic apparatus 200 first among the terminal apparatuses, and thus radio wave intensity is used for determination.

Figure 17:
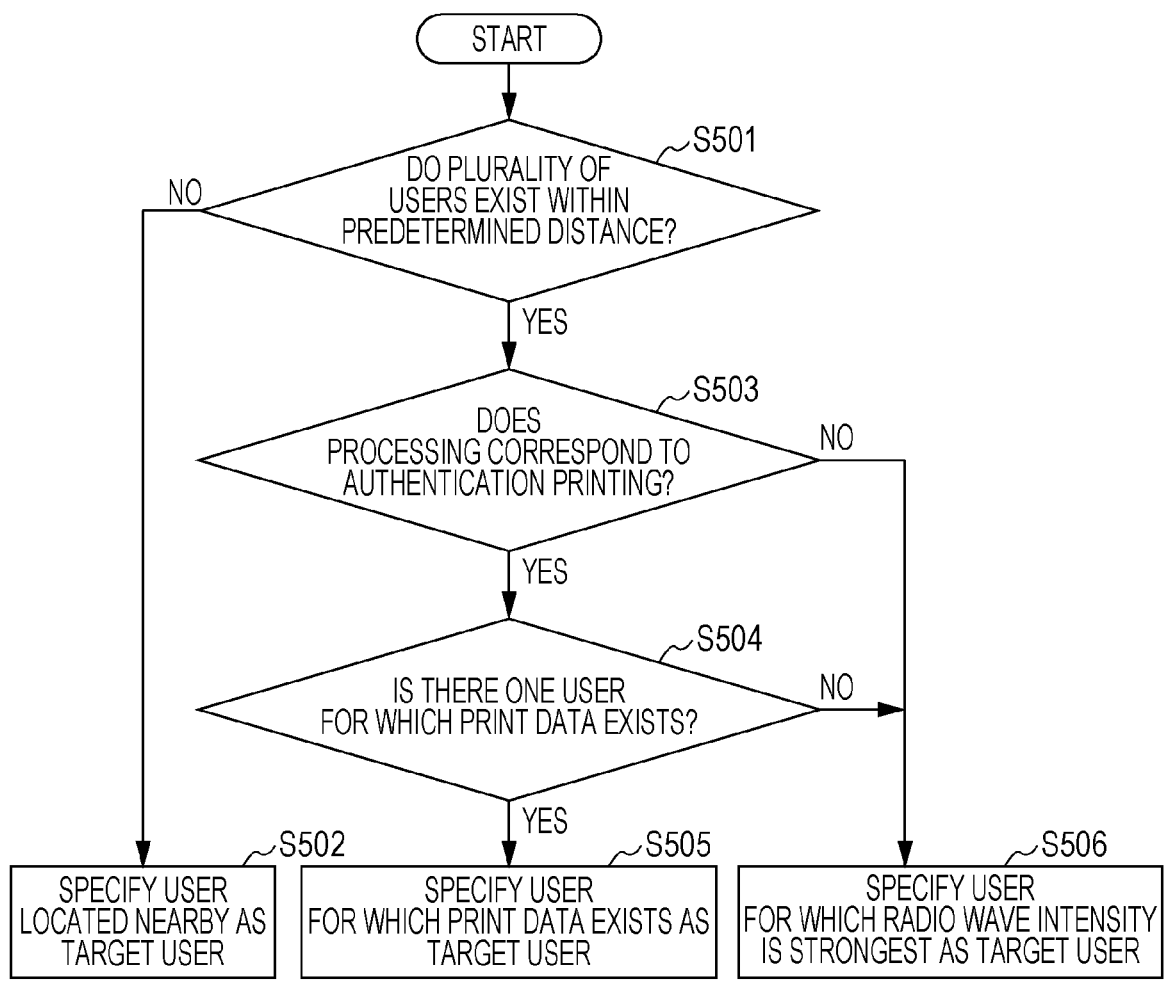
FIG. 17 is a flowchart for explaining processing according to a modification example.

FIG. 17 is a flowchart for explaining processing according to the present modification example. When processing is started, the processing unit 210 determines whether or not there are a plurality of terminal apparatuses 100 (a plurality of users) at a distance equal to or shorter than the first reference distance (S501). In a case where there is one terminal apparatus 100 at a distance equal to or shorter than the first reference distance (NO in S501), the processing unit 210 determines the user of the terminal apparatus 100 as a screen display target (S502).

In a case where there are a plurality of terminal apparatuses 100 at a distance equal to or shorter than the first reference distance (YES in S501), the electronic apparatus 200 determines whether or not an execution of the authentication job is set to an enabled mode (S503). In a case where an execution of the authentication job is enabled (YES in S503), the electronic apparatus 200 determines whether or not there is one user for whom the authentication job exists (print data of authentication printing) (S504).

In a case where there is only one user, that is, in a case where there is one authentication job corresponding terminal apparatus (YES in S504), the electronic apparatus 200 determines the user of the authentication job corresponding terminal apparatus as a target. In a case where an execution of the authentication job is set to be disabled in the electronic apparatus 200 (NO in S503) or in a case where there are a plurality of authentication job corresponding terminal apparatuses (NO in S504), the electronic apparatus 200 determines the user of the terminal apparatus 100 with the strongest radio wave intensity as a target (S506).

After the target user (terminal apparatus 100) is determined, the processing unit 210 executes the processing of S104 in FIG. 7 or the processing of S303 and S304 of FIG. 15 for the user.

In addition, as illustrated in FIG. 1, the method according to the present embodiment can be applied to the communication system 10 including the electronic apparatus 200 and the terminal apparatus 100.

In addition, a part or most of the processing of the terminal apparatus 100 and the electronic apparatus 200 according to the present embodiment may be realized by a program. In this case, a processor such as a CPU executes the program, and thus the terminal apparatus 100 and the like according to the present embodiment are realized. Specifically, the program stored in a non-transitory information storage medium is read, and the read program is executed by a processor such as a CPU. Here, the information storage medium (computer-readable storage medium) stores programs, data, and the like, and a function thereof is realized by an optical disk (DVD, CD, or the like), a hard disk drive (HDD), or a memory (card type memory, ROM, or the like). The processor such as a CPU performs various processing according to the present embodiment based on the program (data) stored in the information storage medium. That is, the information storage medium stores a program (a program for causing a computer to execute processing of each unit) for causing a computer (an apparatus including an operation unit, a processing unit, a storage unit, and an output unit) to function as each unit according to the present embodiment.

As described above, the embodiments and the modification examples according to the invention have been described by way of example only, and are not intended to limit the scope of the invention. The invention can be embodied by modifying components at a stage of implementation within the scope not deviating from the gist of the invention. In addition, various inventions can be made by appropriately combining a plurality of components disclosed in each of the above-described embodiments and modification examples. For example, some components may be deleted from all components described in each of the embodiments and the modification examples. In addition, components described in different embodiments and modification examples may be appropriately combined. Further, in the specification or the drawings, a term described at least once together with a different term having a wider sense or an equivalent sense may be replaced with the different term in any portion of the specification or the drawings. As described above, various modifications and applications may be made without departing from the gist of the invention.

The entire disclosure of Japanese Patent Application No. 2017-171098, filed Sep. 6, 2017 is expressly incorporated by reference herein.

What is claimed is:

1. An electronic apparatus comprising:
a communication unit that receives a beacon signal from a terminal apparatus carried by a user, the terminal apparatus is configured to broadcast an advertisement packet via the beacon signal, and the advertisement packet includes information related to the user;
a display unit; and
a processing unit that controls the display unit,
wherein the processing unit determines a distance between the electronic apparatus and the terminal apparatus based on a radio wave intensity of the received beacon signal, and performs processing of displaying in a first screen mode, in a case where the determined distance is equal to or shorter than a first reference distance, and
wherein the processing unit performs processing of changing screen mode from the first screen mode to a second screen mode different from the first screen mode, in a case where the determined distance is equal to or shorter than a second reference distance which is shorter than the first reference distance, and
wherein in the second screen mode, the processing unit causes the display unit to display a particular screen based on the received information related to the user via the beacon signal,
wherein the processing unit determines a plurality of authentication job corresponding terminal apparatuses, each of which is the terminal apparatus as being determined that the distance is equal to or shorter than the first reference distance and determined that the job corresponding to the user of the terminal apparatus is present based on the authentication job information,
wherein, in a case where there is only one authentication job corresponding terminal apparatus, the processing unit performs processing of displaying the screen corresponding to the authentication job corresponding terminal apparatus on the display unit, and
wherein, in a case where there are a plurality of authentication job corresponding terminal apparatuses, the processing unit performs processing of displaying the screen corresponding to the terminal apparatus with the strongest radio wave intensity of the beacon signal among the plurality of authentication job corresponding terminal apparatuses, on the display unit.

2. The electronic apparatus according to claim 1,
wherein the processing unit performs processing of generating the screen and processing of turning-off a light source of the display unit in a case where it is determined that the distance is equal to or shorter than the first reference distance and longer than the second reference distance, and
wherein the processing unit performs processing of turning-on the light source in a case where it is determined that the distance is equal to or shorter than the second reference distance.

3. The electronic apparatus according to claim 1,
wherein the processing unit performs processing of causing the display unit to transition to a non-display state in a case where it is determined that the distance is longer than the first reference distance or in a case where the beacon signal is not received.

4. The electronic apparatus according to claim 1,
wherein, in a power saving state, in a case where it is determined that the distance is equal to or shorter than the first reference distance, the processing unit performs return processing from the power saving state, and
wherein, in a state returned from the power saving state, in a case where it is determined that the distance exceeds a third reference distance which is equal to or longer than the first reference distance, the processing unit performs transition processing to the power saving state.

5. A communication system comprising:
the electronic apparatus according to claim 1; and
a terminal apparatus.

6. An electronic apparatus comprising:
a communication unit that receives a beacon signal from a terminal apparatus carried by a user, the terminal apparatus is configured to broadcast an advertisement packet via the beacon signal, and the advertisement packet includes information related to the user;
a display unit; and
a processing unit that controls the display unit,
wherein, the processing unit determines a distance between the electronic apparatus and the terminal apparatus based on a radio wave intensity of the received beacon signal, in a case where the determined distance is equal to or shorter than a first reference distance, the processing unit performs processing of determining a screen to be displayed to a user of the terminal apparatus from which the beacon signal is transmitted based on at least one of authentication job information of the user of the terminal apparatus from which the beacon signal is transmitted, use history information of the user, and user type information, and displaying the determined screen on the display unit, wherein the processing unit determines a plurality of authentication job corresponding terminal apparatuses, each of which is the terminal apparatus as being determined that the distance is equal to or shorter than the first reference distance and determined that the job corresponding to the user of the terminal apparatus is present based on the authentication job information, wherein, in a case where there is only one authentication job corresponding terminal apparatus, the processing unit performs processing of displaying the screen corresponding to the authentication job corresponding terminal apparatus on the display unit, and wherein, in a case where there are a plurality of authentication job corresponding terminal apparatuses, the processing unit performs processing of displaying the screen corresponding to the terminal apparatus with the strongest radio wave intensity of the beacon signal among the plurality of authentication job corresponding terminal apparatuses, on the display unit.

7. The electronic apparatus according to claim 6,
wherein, in a case where it is determined that setting for performing authentication processing is enabled in an execution of a job and it is determined that there is a job corresponding to the user of the terminal apparatus at the distance equal to or shorter than the first reference distance based on the authentication job information, the processing unit performs processing of displaying a job selection screen on the display unit.

8. The electronic apparatus according to claim 6,
wherein the processing unit acquires the use history information of the user of the terminal apparatus from which the beacon signal is transmitted based on the beacon signal, and
wherein the processing unit performs processing of selecting one function among a plurality of functions of the electronic apparatus based on the use history information, and displaying the screen corresponding to the selected function on the display unit.

9. The electronic apparatus according to claim 6,
wherein the processing unit acquires, as the user type information, information indicating whether or not the user of the terminal apparatus from which the beacon signal is transmitted is a user who performs maintenance, based on the beacon signal, and
wherein the processing unit performs processing of displaying a maintenance screen on the display unit in a case where the user is a user who performs maintenance.

10. A printing apparatus comprising:
a communication unit that receives a beacon signal based on a Bluetooth communication standard from a terminal apparatus carried by a user, the terminal apparatus is configured to broadcast an advertisement packet via the beacon signal, and the advertisement packet includes information related to the user; and
a processing unit that determines a distance between the printing apparatus and the terminal apparatus based on a radio wave intensity of the received beacon signal,
wherein, in a power saving state, in a case where the determined distance is equal to or shorter than a first reference distance, the processing unit performs return processing from the power saving state,
wherein, in a state returned from the power saving state, in a case where the determined distance is equal to or longer than the first reference distance, the processing unit performs transition processing to the power saving state,
wherein the processing unit determines a plurality of authentication job corresponding terminal apparatuses, each of which is the terminal apparatus as being determined that the distance is equal to or shorter than the first reference distance and determined that the job corresponding to the user of the terminal apparatus is present based on the authentication job information,
wherein, in a case where there is only one authentication job corresponding terminal apparatus, the processing unit performs processing of displaying the screen corresponding to the authentication job corresponding terminal apparatus on the display unit, and
wherein, in a case where there are a plurality of authentication job corresponding terminal apparatuses, the processing unit performs processing of displaying the screen corresponding to the terminal apparatus with the strongest radio wave intensity of the beacon signal among the plurality of authentication job corresponding terminal apparatuses, on the display unit.

* * * * *